United States Patent
Mori et al.

(10) Patent No.: US 7,426,057 B2
(45) Date of Patent: Sep. 16, 2008

(54) DOCUMENT PROCESSING METHOD

(75) Inventors: Yasuo Mori, Kanagawa (JP); Junko Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 982 days.

(21) Appl. No.: 10/780,655

(22) Filed: Feb. 19, 2004

(65) Prior Publication Data

US 2004/0163049 A1 Aug. 19, 2004

(30) Foreign Application Priority Data

Feb. 19, 2003 (JP) ............................ 2003-041544

(51) Int. Cl.
*G06F 15/00* (2006.01)
*G06K 1/00* (2006.01)

(52) U.S. Cl. .................... 358/1.18; 358/1.15; 358/1.16; 358/1.2; 715/530; 715/748

(58) Field of Classification Search ............... 358/1.15, 358/1.18, 1.16, 1.2; 715/530, 748
See application file for complete search history.

(56) References Cited

U.S. PATENT DOCUMENTS

| 7,145,687 B2 * | 12/2006 | Nishikawa et al. .......... 358/1.18 |
| 7,295,336 B2 * | 11/2007 | Yoshida et al. ............. 358/1.15 |
| 2002/0131086 A1 | 9/2002 | Mori et al. ................. 358/1.18 |
| 2003/0056174 A1 | 3/2003 | Nara et al. .................. 715/514 |
| 2003/0056176 A1 | 3/2003 | Tanaka et al. ............... 715/522 |
| 2003/0056177 A1 | 3/2003 | Nara et al. .................. 715/525 |
| 2003/0056179 A1 | 3/2003 | Mori .......................... 715/530 |
| 2003/0056180 A1 | 3/2003 | Mori .......................... 715/530 |
| 2003/0070146 A1 | 4/2003 | Sato et al. ................... 715/525 |

(Continued)

FOREIGN PATENT DOCUMENTS

JP 5334298 12/1993

(Continued)

OTHER PUBLICATIONS

Office Action, dated Sep. 18, 2007, in JP 2003-041544.

*Primary Examiner*—Twyler L. Haskins
*Assistant Examiner*—Satwant K Singh
(74) *Attorney, Agent, or Firm*—Fitzpatrick, Cella, Harper & Scinto

(57) ABSTRACT

The object of the present invention is to create a template for print settings used for printing a document based on an existing document. To achieve the object, the present invention is capable of registering the print settings for a document being currently edited as template information and reading the registered template information as print settings for the document being currently edited or a new document. Thus, in the present invention, the print settings for an existing document can be utilized as print settings for printing a document. More preferably, the contents of a registered template can be edited. More preferably, a document in the present invention has a tree structure with pages as leaves; print settings can be made for each subtree; and, when a template is registered, the print settings made for the entire tree structure are registered as the template. More preferably, the document has a tree structure with pages as leaves; print settings can be made for each subtree; settings made at a lower hierarchy are preferentially applied to overlapped setting items; and when a template is registered, the print settings applied to a selected subtree is registered as a template. More preferably, the print settings can be modified by editing the document.

21 Claims, 22 Drawing Sheets

U.S. PATENT DOCUMENTS

2003/0159114 A1 * 8/2003 Nishikawa et al. .......... 715/530

FOREIGN PATENT DOCUMENTS

| JP | 6119327 | 4/1994 |
| JP | 2001084245 | 3/2001 |
| JP | 2001243031 | 9/2001 |
| JP | 2002200814 | 7/2002 |

* cited by examiner

FIG. 4A

| NO | PROPERTY INFORMATION | | REMARKS |
|---|---|---|---|
| 1 | PRINTING METHOD | SINGLE-SIDED / TWO-SIDED / BOOKBINDING PRINTING | |
| 2 | PAPER SIZE | SCRIPT SIZE / FIXED SIZE | • WHEN "A4+A3", "B4+B3", OR "LETER+LEDGER (11×17)" IS SPECIFIED, Z FOLD IS SPECIFIED<br>• WHEN BOOKBINDING PRINTING OR N-up PRINTING IS SPECIFIED, SCRIPT SIZE OF THE FIRST CHAPTER / FIRST PAGE IS AUTOMATICALLY SELECTED |
| 3 | PAPER DIRECTION | PORTRAIT / LANDSCAPE | • SELECTABLE ONLY IN THE CASE OF FIXED SIZE |
| 4 | BINDING WIDTH / BINDING DIRECTION | | • SHIFT / ENLARGEMENT OR REDUCTION CAN BE SPECIFIED |
| 5 | N-up PRINTING | NUMBER OF PAGES / ARRANGEMENT ORDER / BORDER LINE / ARRANGEMENT POSITION, etc | • NINE (9) ARRANGEMENT POSITION PATTERNS ARE SUPPLIED<br>• ONE-TO-ONE MAGNIFICATION CAN BE SPECIFIED |
| 6 | ENLARGEMENT / REDUCTION | ON / OFF | WHEN FIXED SIZE IS SELECTED FOR PAPER SIZE OR N-up PRINTING IS SELECTED, "ON" IS AUTOMATICALLY SPECIFIED. "OFF" CAN BE SPECIFIED |
| 7 | WATERMARK | | • INDIVIDUAL SPECIFICATION FOR EACH LOGICAL PAGE OR EACH PHYSICAL PAGE IS POSSIBL<br>• ALL CHAPTERS / ALL PAGES ARE TO BE COVERED |

FIG. 4B

| | | |
|---|---|---|
| 8 | HEADER / FOOTER | • INDIVIDUAL SPECIFICATION FOR EACH LOGICAL PAGE OR EACH PHYSICAL PAGE IS POSSIBLE<br>• ALL CHAPTERS / ALL PAGES ARE TO BE COVERED |
| 9 | PAPER DISCHARGE METHOD | STAPLING / PUNCH HOLES | • STAPLING / PUNCH HOLES ARE AVAILABLE ONLY FOR SINGLE-SIDED / TWO-SIDED PRINTING<br>• STAPLING IS SPECIFIED FOR 1 POSITION / 2 POSITIONS |
| 10 | DETAILS OF BOOKBINDING | TWO-PAGE SPREAD DIRECTION; SADDLE STITCH; SPECIFICATION OF ENLARGEMENT / REDUCTION; GUTTER; SPECIFICATION OF DIVISION INTO VOLUMES; etc | • ONLY FOR BOOKBINDING PRINTING |
| 11 | COVER / BACK COVER | | • SPECIFICATION OF PRINT FOR COVER (1/2) AND BACK COVER (1/2)<br>• SPECIFICATION OF PAPER FEED PORT (INCLUDING INSERTER) |
| 12 | INDEX PAPER | | • PRINTOUT OF CHARACTER STRING ONTO INDEX PORTION AND SETTING OF ANNOTATION ONTO INDEX PAPER ARE POSSIBLE<br>• SPECIFICATION IS NOT POSSIBLE FOR BOOKBINDING PRINTING |
| 13 | SLIP PAPER | | • SPECIFICATION OF PAPER FEED PORT (INCLUDING INSERTER)<br>• SCRIPT DATA CAN BE PRINTED ON INSERTED PAPER<br>• SPECIFICATION IS NOT POSSIBLE FOR BOOKBINDING PRINTING |
| 14 | CHAPTER SEPARATION | "NONE" / "CHANGE PAGE" / "CHANGE PAPER" | • WHEN INDEX PAPER OR SLIP PAPER IS SPECIFIED, "CHANGE PAPER" IS FIXED<br>• "CHANGE PAPER" IS SET FOR SINGLE-SIDED PRINTING |

FIG. 5

| NO | PROPERTY INFORMATION | | REMARKS |
|---|---|---|---|
| 1 | PAPER SIZE | SCRIPT SIZE / FIXED SIZE | • WHEN FIXED SIZE IS SELECTED, "CHANGE PAPER" IS AUTOMATICALLY SPECIFIED<br>• WHEN MULTIPLE KINDS OF PAPER ARE SELECTED FOR A BOOK, MODIFICATION IS POSSIBLE ONLY FOR SPECIFIED PAPER. WHEN PAPER SIZE IS SPECIFIED TO BE ADJUSTED TO BOOK, PAPER SIZE CAN ALSO BE MODIFIED |
| 2 | PAPER DIRECTION | PORTRAIT / LANDSCAPE | • SELECTION IS POSSIBLE ONLY IN THE CASE OF FIXED SIZE |
| 3 | SPECIFICATION OF N-up PRINT | NUMBER OF PAGES / ARRANGEMENT ORDER / BORDER LINE / ARRANGEMENT POSITION, etc | • NINE (9) ARRANGEMENT POSITION PATTERNS ARE SUPPLIED<br>• ONE-TO-ONE MAGNIFICATION CAN BE SPECIFIED |
| 4 | ENLARGEMENT/ REDUCTION | ON / OFF | • WHEN FIXED SIZE IS SELECTED FOR PAPER SIZE OR N-up PRINTING IS SELECTED, "ON" IS AUTOMATICALLY SPECIFIED "OFF" CAN BE SPECIFIED |
| 5 | WATERMARK | DISPLAY / NON-DISPLAY | • SPECIFICATION OF WHETHER ALL WATERMARKS SPECIFIED FOR BOOK SHOULD BE DISPLAYED OR NOT |
| 6 | HEADER / FOOTER | DISPLAY / NON-DISPLAY | • SPECIFICATION OF WHETHER ALL HEADERS / FOOTERS SPECIFIED FOR BOOK SHOULD BE DISPLAYED OR NOT |
| 7 | PAPER DISCHARGE METHOD | STAPLING | • WHEN STAPLING IS SPECIFIED FOR BOOK, "OFF" CAN BE SPECIFIED.<br>DEFAULT IS "ON" |

FIG. 6

| NO | PROPERTY INFORMATION | | REMARKS |
|---|---|---|---|
| 1 | SPECIFICATION TO TURN PAGE | | • SPECIFICATION OF 0/90/180/270 DEGREES IS POSSIBLE |
| 2 | WATERMARK | DISPLAY / NON-DISPLAY | • SPECIFICATION OF WHETHER ALL WATERMARKS SPECIFIED FOR BOOK SHOULD BE DISPLAYED OR NOT |
| 3 | HEADER / FOOTER | DISPLAY / NON-DISPLAY | • SPECIFICATION OF WHETHER ALL HEADERS/FOOTERS SPECIFIED FOR BOOK SHOULD BE DISPLAYED OR NOT |
| 4 | ZOOM | 50% - 200% | • SPECIFICATION OF RELATIVE MAGNIFICATION WITH SIZE FITTED TO VIRTUAL LOGICAL PAGE AREA AS 100% |
| 5 | ARRANGEMENT POSITION | | • NINE (9) FIXED PATTERNS; SPECIFICATION OF ANY POSITION |
| 6 | ANNOTATION | | |
| 7 | VARIABLE ITEM | | |
| 8 | PAGE DIVISION | | |

DOCUMENT PROCESSING METHOD

FIELD OF THE INVENTION

The present invention relates to a document processing method providing a function of making print settings for document data generated by a document processing program, for example.

BACKGROUND OF THE INVENTION

According to types of data, such as characters, a table and an image, the structure defining the data and editing operations performed for the data vary, and therefore various application programs appropriate for various types of data have been provided. Accordingly, a user who utilizes such data is required to use different applications according to the type of data, such as a character-processing program for editing characters, a spreadsheet program for editing a table, and an image-editing program for editing an image.

As described above, it is common that a user uses different application programs according to types of data. However, a document created by a user is generally a document consisting of multiple types of data, such as characters and tables, characters and images and the like rather than a document consisting of only a single type of data, such as only characters, only tables, only images and the like. Accordingly, in order to create a desired document including multiple types of data, the user has to utilize printing functions provided for various applications to print each data with each application and then combine the printed materials in a desired order.

Alternatively, there is a program called "Office Suite" forming an integrated application with various applications, which provides a function of combining data generated by the applications to construct a document. By using this integrated application, the user can integrate data created with the applications into one document using a particular application included in the integrated application.

Traditionally, such an integrated application provides a function of registering information, such as page layout, output paper, and single-sided/two-sided/bookbinding, set for an edited document with a client as a template in advance. When creating a new document, a user can select a template with desired settings from among several registered patterns of templates and thereby easily edit the document file.

The template can be converted and stored into a file. The user can create a new template file or modify existing template data. There is also provided a function of importing/exporting a template file which enables such a template file to be taken out to or brought in from a different PC.

However, in a prior-art system, the only way for a user to create such a template is to modify the settings for an existing template supplied for an application to change property values to desired ones, or create and register a new template with default values (for example, settings such as "1 UP", "single-sided", "without finishing" and the like) as initial values. Actually, however, the user has often already made necessary settings for a document file beforehand. Therefore, if he wants to create a template using the settings for the exiting document file, he has to make the same editing settings for the template again as those set for the document file to create the template.

SUMMARY OF THE INVENTION

The present invention has been made in consideration of the prior embodiments described above, and its object is to provide a document processing method enabling creation of a template based on setting information, such as output paper, page layout and bookbinding, which has already been set for a document file.

To achieve the above object, a document processor of the present invention is configured as follows.

According to the present invention, a document processing method wherein print settings for printing a document are changeable, the method comprises: a registration process for registering print settings for a document being edited as template information; and a reading process for reading the template information registered by the registration process as print settings for the document being edited or a new document.

Preferably, according to another aspect of the present invention, the document processing method further comprises a template editing process for editing the contents of a template registered by the registration process.

Preferably, according to another aspect of the present invention, the document has a tree structure with pages as leaves; print settings are settable for each subtree; and the registration process registers print settings set for the whole of the tree structure as a template.

Preferably, according to another aspect of the present invention, the document has a tree structure with pages as leaves; print settings are settable for each subtree; settings made at a lower hierarchy are preferentially applied to overlapped setting items; and the registration process registers print settings to be applied to a selected subtree as a template.

Preferably, according to another aspect of the present invention, the method further comprises a document editing process for editing the document, wherein print settings are changeable by the document editing process.

Preferably, according to another aspect of the present invention, the print settings include at least any of printing method, paper direction, gutter and binding direction, page layout, enlargement/reduction, watermark, header and footer, paper discharge method, setting of bookbinding, cover and back cover, index paper, slip paper and chapter separation.

Preferably, according to another aspect of the present invention, a document processor capable of changing print settings for printing a document, the document processor comprises: registration means for registering print settings for a document being edited as template information; and reading means for reading the template information registered by the registration means as print settings for the document being edited or a new document.

Preferably, according to another aspect of the present invention, the document processor further comprises template editing means for editing the contents of a template registered by the registration means.

Preferably, according to another aspect of the present invention, the document has a tree structure with pages as leaves; print settings are settable for each subtree; and the registration means registers print settings set for the whole of the tree structure as a template.

Preferably, according to another aspect of the present invention, the document has a tree structure with pages as leaves; print settings are settable for each subtree; settings made at a lower hierarchy are preferentially applied to overlapped setting items; and the registration means registers print settings to be applied to a selected subtree as a template.

Preferably, according to another aspect of the present invention, the document processor further comprises document editing means for editing the document, wherein print settings are changeable by the document editing means.

Preferably, according to another aspect of the present invention, the print settings include at least any of printing method, paper direction, gutter and binding direction, page layout, enlargement/reduction, watermark, header and footer, paper discharge method, setting of bookbinding, cover and back cover, index paper, slip paper and chapter separation.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4A shows an example of book properties according to this embodiment;

FIG. 4B shows an example of book properties according to this embodiment;

FIG. 5 shows an example of chapter properties according to this embodiment;

FIG. 6 shows an example of page properties according to this embodiment;

DETAILED DESCRIPTION OF THE PREFERRED EMBODIMENTS

A preferred embodiment of the present invention will be described in detail below with reference to accompanying drawings.

<Outline of System>

Outline of a document processing system according to the first embodiment will be described with reference to FIGS. 1 to 12. In this document processing system, data file created by a general application is converted into an electronic script file by an electronic script writer. A bookbinding application provides a function of editing the electronic script file. The details will be now described below.

<System Configuration and Operation>

Figure 1:
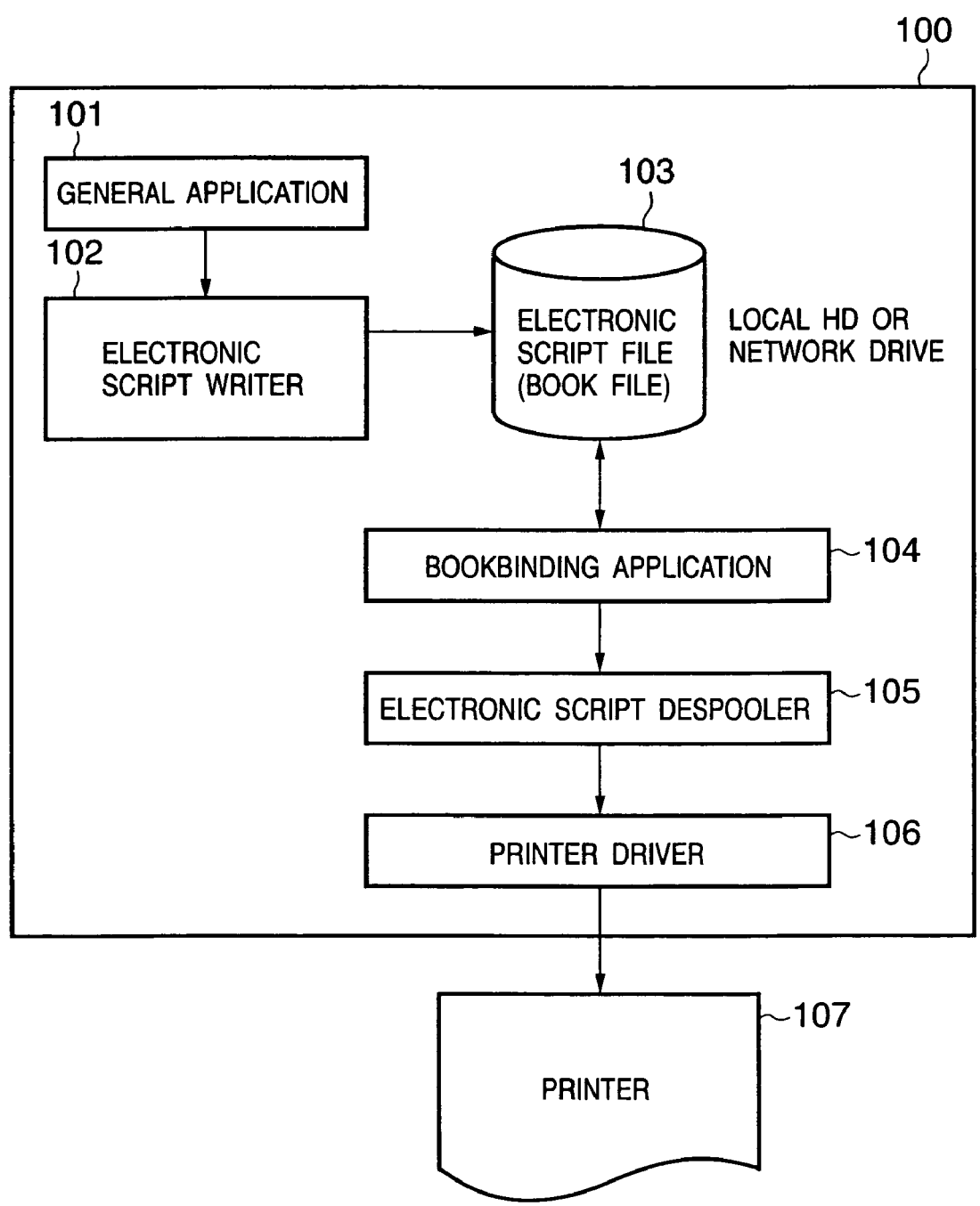
FIG. 1 is a block diagram illustrating a configuration of a stand-alone type document processing system according to an embodiment of the present invention.

FIG. 1 shows a software configuration of a document processing system preferable for an information processing system according to the embodiment of the present invention.

The document processing system is realized by a digital computer 100, a preferable embodiment of the information processor according to this embodiment. General applications 101 are application programs providing functions such as word processing, spreadsheeting, photo-retouching, drawing or painting, presentation and text editing, and are provided with a printing function. When printing created application data, such as document data and image data, these application programs utilize a predetermined interface provided by the operating system (OS). That is, the applications 101 send a predetermined output command (DGI function) in a format dependent on the OS to an output module of the OS which provides the interface to print created data. Receiving the output command, the output module converts the command into a format which can be processed by an output device such as a printer, and outputs the converted command (DDI function). The format which can be processed by an output device varies according to the kind, manufacturer and model of devices, and accordingly a device driver is provided for each device. The OS converts the command by utilizing the device driver to generate print data, and brackets the command with JL (Job Language) to generate a print job. When Windows® by Microsoft Corporation is used as the OS, a module called GDI (Graphic Device Interface) corresponds to the output module described above.

An electronic script writer 102 is an improvement of the device driver described above and is a software module provided to realize the document processing system. The electronic script writer 102, however, does not target at a particular output device and generates an electronic script file 103 by converting the output command into a format which can be processed by a bookbinding application 104 or a printer driver 106 to be described later. The format which has been converted by the electronic script writer 102 (hereinafter referred to as an "electronic script format") may be any format only if the script in pages can be expressed in a detailed form. Among practically standard formats, the PDF format and the SGML format by Adobe Systems Incorporated, for example, can be used. In order to cause the application 101 to utilize the electronic script writer 102, the electronic script writer 102 is specified as the device driver to be used for output prior to executing printing. The electronic script file as created by the electronic script writer 102, however, is not necessarily provided with all the settings required for an electronic script file. Therefore, it is the bookbinding application 104 that specifies the electronic script writer 102 as a device driver, and conversion from application data into an electronic script file is performed under the control thereof. The bookbinding application 104 completes a new electronic script file generated by the electronic script writer 102 as an electronic script file in a format to be described later. In the description below, when it is required to differentiate the electronic script files, the file created by the electronic script writer 102 is called an "electronic script file" and the electronic script file which has been given a structure by the bookbinding application 104 is called a "book file". When such differentiation is not especially required, any of the document file, electronic script file and book file generated by an application is called a document file (or document data).

As described above, by specifying the electronic script writer 102 as a device driver and causing the general application 101 to print the data, the application data is converted into an electronic script format in which a page defined by the general application 101 (hereinafter referred to as a "logical page" or a "script page") is a unit and stored in a storage medium, such as a hard disk, as an electronic script file 103. The hard disk may be a local drive provided for a computer which realizes the document processing system according to this embodiment, or a drive provided on a network if the network is connected.

The bookbinding application 104 provides a user with functions of reading and editing an "electronic script file" or a "book file" 103. However, the bookbinding application 104 does not provide a function of editing the contents of each page but provides a function of editing the structure of a chapter or a book constructed with a page as the minimum unit, which is described later.

When printing an electronic script file 103 edited by the bookbinding application 104, an electronic script despooler 105 is activated by the bookbinding application 104. The electronic script despooler 105 reads a specified book file from the hard disk, and then generates an output command suitable for the above-described output module of the OS and outputs the output command to the output module not shown in order to print each page in a format described in the book file. A printer driver 106 for a printer 107 to be used as the output device is specified as the device driver then. The output module then uses the specified printer driver 106 of the printer 107 to convert the received output command into a device command which can be interpreted and executed by the printer 107. The device command is then sent to the printer 107, and an image in accordance with the command is printed by the printer 107.

Figure 2:
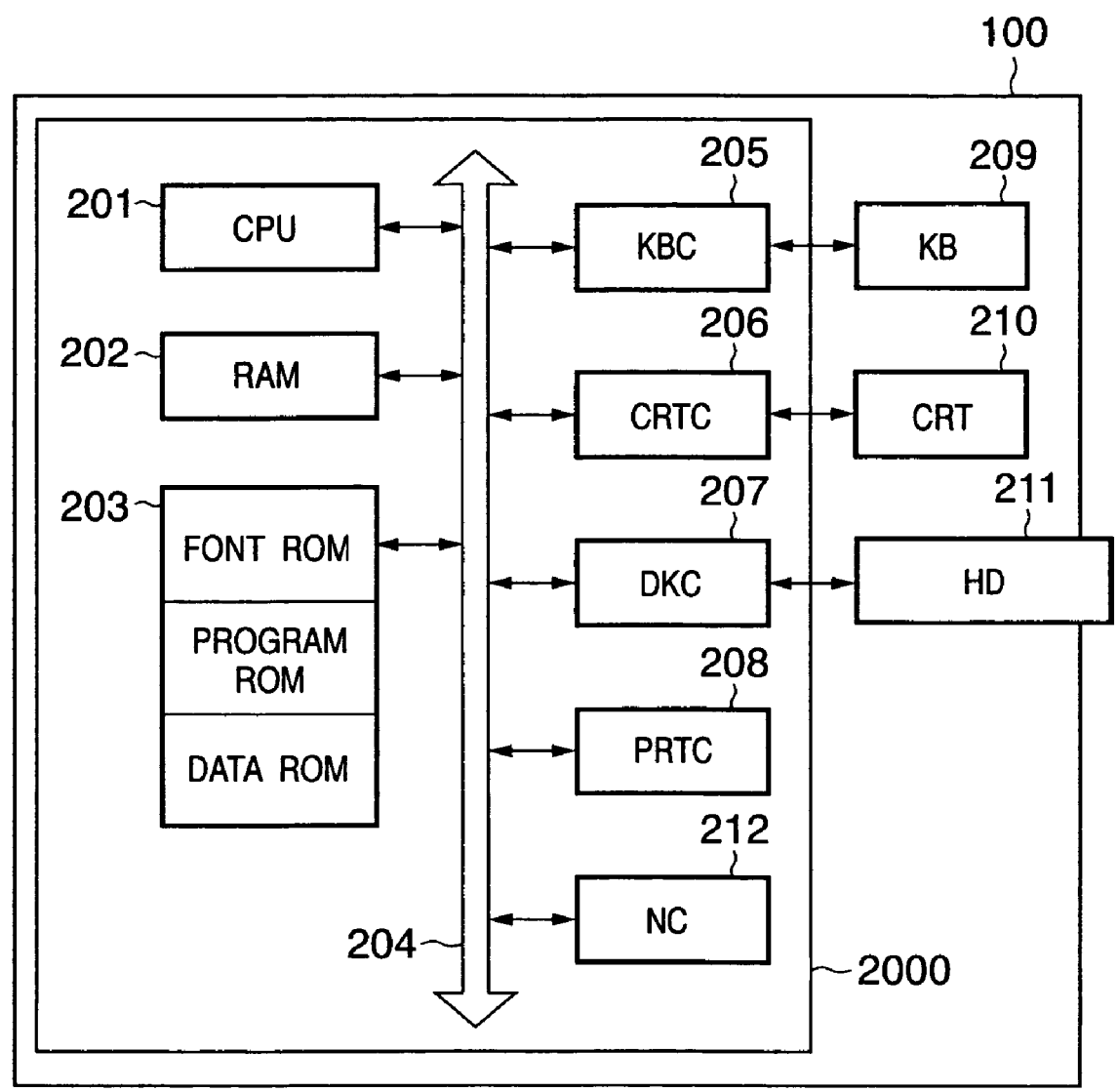
FIG. 2 is a block diagram showing a configuration of a host computer of the document processing system according to this embodiment.

FIG. 2 is a block diagram showing a hardware configuration of the digital computer 100 shown in FIG. 1.

In FIG. 2, a CPU 201 executes a program, such as the OS, the general applications 101 and the bookbinding application 104, stored in a ROM for programs of a ROM 203 or downloaded from a hard disk 211 to a RAM 202 to realize the software configuration in FIG. 1 or procedures of flowcharts to be described later. The RAM 202 functions as a main memory, a work area and the like for the CPU 201. A keyboard controller (KBC) 205 controls key input from a keyboard 209 or a pointing device not shown. The CRT controller (CRTC) 206 controls display of a display section 210. The display section 210 is not limited to a CRT and may be a liquid crystal or plasma display. A disk controller (DKC) 207 controls access to the hard disk (HD) 211 and a floppy® disk (FD) not shown, for storing a boot program, various applications, font data, user files, edited files to be described later, and the like. A PRTC 208 controls exchange of a signal with the connected printer 107. An NC 212 is connected to the network and controls communication with other equipment connected to the network.

<Format of Electronic Script Data>

Before describing the details of the editing application 104, the data format of the above-mentioned "book file" will be described.

The book file has a three-layer structure to imitate a book which is a paper medium. The highest layer is called a "book", which imitates a book. Properties applied to the entire book are defined there. The intermediate layer below the highest layer corresponds to a chapter of a book and is also called a "chapter". Properties can also be defined for each "chapter". The lowest layer is a "page", which corresponds to each page defined by the application program. Properties can also be defined for each "page" A "book" may include multiple "chapters", and a "chapter" may include multiple "pages".

Figure 3A:
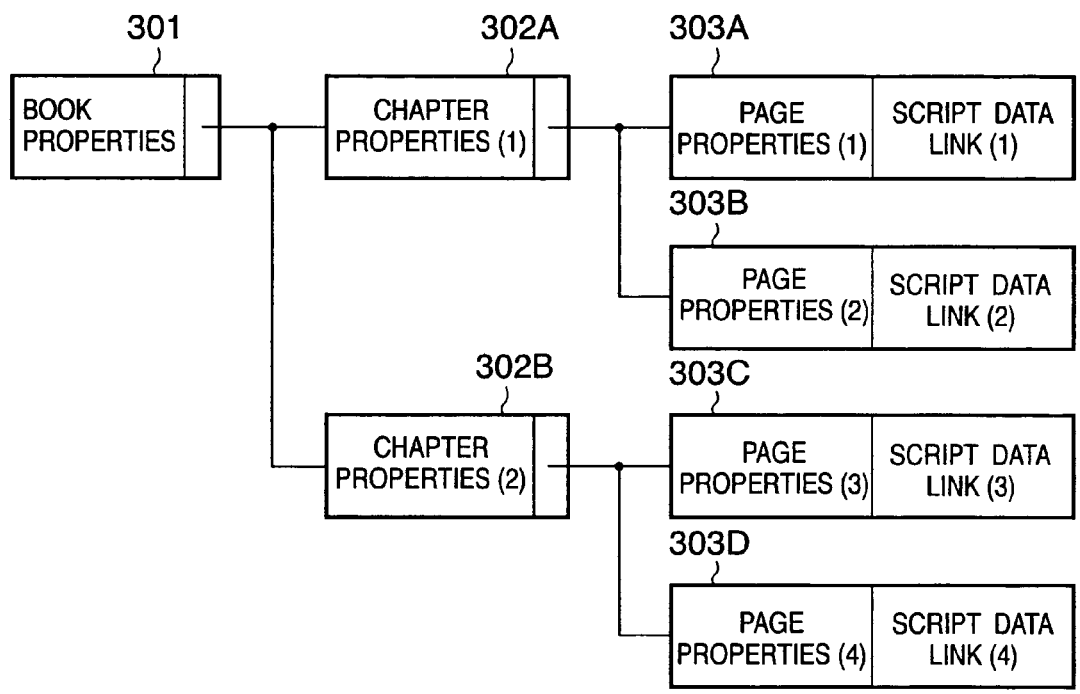
FIG. 3A shows an example of a typical structure of a book file according to this embodiment and typically shows an example of a book file format.

FIG. 3A typically shows an example of a book file format. The "book", "chapters" and "pages" in the book file of this example are indicated by nodes corresponding to them. A book file includes a "book". Since the "book" and "chapter" are concepts for defining a structure as a "book", they include the defined property values and links to a lower layer as the substance. A "page" has data for each "page" outputted by the application program as the substance. Therefore, a "page" includes the substance of a script page (script page data) and links to script page data in addition to its property values. A print page outputted onto a paper medium and the like may include multiple script pages. This structure, however, is not indicated by links but displayed as a property for each hierarchy of the "book", "chapter" and "page".

In FIG. 3A, book properties are defined for the a book 301, and two chapters 302A and 302B are linked thereto. These links indicate that the chapters 302A and 302B are included in the book 301. Furthermore, pages 303A and 303B are linked to the chapter 302A, indicating that these pages are included therein. In each of the pages 303A and 303B, property values therefor are defined and links to subscript page data (1) and (2), which is the substance of the pages 303A and 303B, are included, respectively. These links point to script data (1) and (2) of script page data 304 shown in FIG. 3B, indicating that the substance of the pages 303A and 303B is script page data (1) and (2), respectively.

Similarly, the chapter 302B includes pages 303C and 303D and includes links to script page data (3) and (4), which is the substance of the pages 303C and 303D. These links point to script page data (3) and (4) of the script page data 304 shown in FIG. 3B, indicating that the substance of the pages 303C and 303D is script page data (3) and (4), respectively.

FIGS. 4A and 4B show the book properties 301 according to this embodiment.

As for items which can be redundantly defined at a lower layer, the property values for a lower layer is preferentially adopted. As for items included only in the book properties 301, the values defined in the book properties 301 are effective through the entire book. However, as for items overlapped with those in a lower layer, the values defined in the book properties 301 are default values to be provided when no definition is made in the lower layer. Each of the items shown in the figure does not necessarily correspond to one specific item but may correspond to multiple related items.

FIG. 5 illustrates chapter properties according to this embodiment, and FIG. 6 illustrates page properties according to this embodiment. The relationship between these chapter properties and the page properties is similar to that between the book properties and the properties for a lower layer described above.

In FIGS. 4A and 4B, the items specific to the book properties 301 are the following six items: "printing method", "details of bookbinding", "cover/back cover", "index paper", "slip paper" and "chapter separation". These items are defined for the entire book.

In FIG. 4A, any of three values of "single-sided printing", "two-sided printing" and "bookbinding printing" can be specified as the "printing method" property. The "bookbinding printing" is a method of printing in a format enabling bookbinding by bundling a separately specified number of pieces of paper, folding the bundle in two and then binding the bundle.

In FIG. 4B, when the "bookbinding printing" is specified for the "printing method", "two-page spread direction", "the number of pieces of paper to be bundled" and the like can be specified as the properties of the "details of bookbinding".

The "cover/back cover" property includes specification that pieces of paper to be a cover and a back cover should be added when printing an electronic script file to be constructed as a book, and specification of the contents to be printed on the added pieces of paper. The "index paper" property includes specification to insert an index paper with a tab separately prepared for a printer as a separator between chapters and specification of the contents to be printed on the index (tab) portion. This property is effective when the printer used is provided with an inserter having a function of inserting paper supplied separately from printing paper into desired positions or when multiple paper feed cassettes are available. The same is true of the "slip paper" property. The "slip paper" property includes specification to insert paper to be fed by an inserter or a paper feed cassette to separate chapters and specification of a paper feed source in the case of inserting slip paper.

The "chapter separation" property includes specification of whether a new piece of paper is to be used, a new print page is to be used, or nothing special is to be done at a separation position between chapters. In the case of the "single-sided printing", use of a new piece of paper and use of a new print page have the same meaning. In the case of the "two-sided printing", continuous chapters are not printed on the same one piece of paper if the "use of a new piece of paper" is specified. If the "use of a new print page" is specified, however, continuous chapters may be possibly printed on the two sides of the same paper.

In the chapter properties shown in FIG. 5, there are not items specific to a chapter, and all the items are overlapped with those for the book properties. Accordingly, if the definition in the chapter properties and the definition in the book properties for the same item differ, the value defined in the chapter properties takes precedence. The items common only to the above-mentioned book properties and chapter properties are the following five: "paper size", "paper direction", "specification of N-up print", "enlargement/reduction", and "paper discharge method". Among these, the "specification of N-up print" property is an item for specifying the number of script pages to be included in one print page. The arrangement to be specified here is 1×1, 1×2, 2×2, 3×3, 4×4 or the like. The "paper discharge method" property is an item for specifying whether the discharged pieces of paper are to be stapled or not, and effectiveness of this property depends on whether the printer used is provided with a stapling function.

In the page properties shown in FIG. 6, the items specific to the page properties are: "specification to turn page", "zoom" "arrangement position", "annotation", "page division" and the like. The "specification to turn page" is an item for specifying the turning angle at which a script page is arranged on a print page. The "zoom" property is an item for specifying scaling magnification of a script page. The scaling magnification is specified with the size of a virtual logical page area as 100%. The virtual logical page area is an area occupied by one script page when script pages are arranged in accordance with specification of the "N-up" and the like. For example, if "1×1" is specified, the virtual logical page area corresponds to one print page, and if "1×2" is specified, it corresponds to an area with edges reduced by approximately 70% relative to edges of one print page.

The properties common to the above-described "book", "chapter" and "page" are "watermark" and "header/footer" properties. A "watermark" is an image or a character string separately specified to be printed in a manner that it is overlapped with data created by an application. The "header" and "footer" are watermarks to be printed at the top margin and the tail margin of each page, respectively. Items which can be specified by a variable are provided for the "header/footer", such as "page number" and "time and date". Though the contents which can be specified for the "watermark" and "header/footer" properties are common to the "chapter" and the "page", but are different in the case of the "book". The contents of the "watermark" and the "header/footer" can be set for the "book". Furthermore, it can be also specified how the "watermark" or the "header/footer" should be printed through the entire book. On the contrary, in the case of the "chapter" and the "page", it is only possible to specify whether the "watermark" or the "header/footer" set for the "book" should be printed or not.

<Procedure for Generating a Book File>

A "book file", an electronic script file to which a structure has been given by the above-mentioned bookbinding application 104 has the structure and the contents as described above. The procedure for creating a book file with the bookbinding application 104 and the electronic script writer 102 will be now described. Creation of a book file is realized as a part of the book file editing operation performed by the bookbinding application 104.

Figure 7:
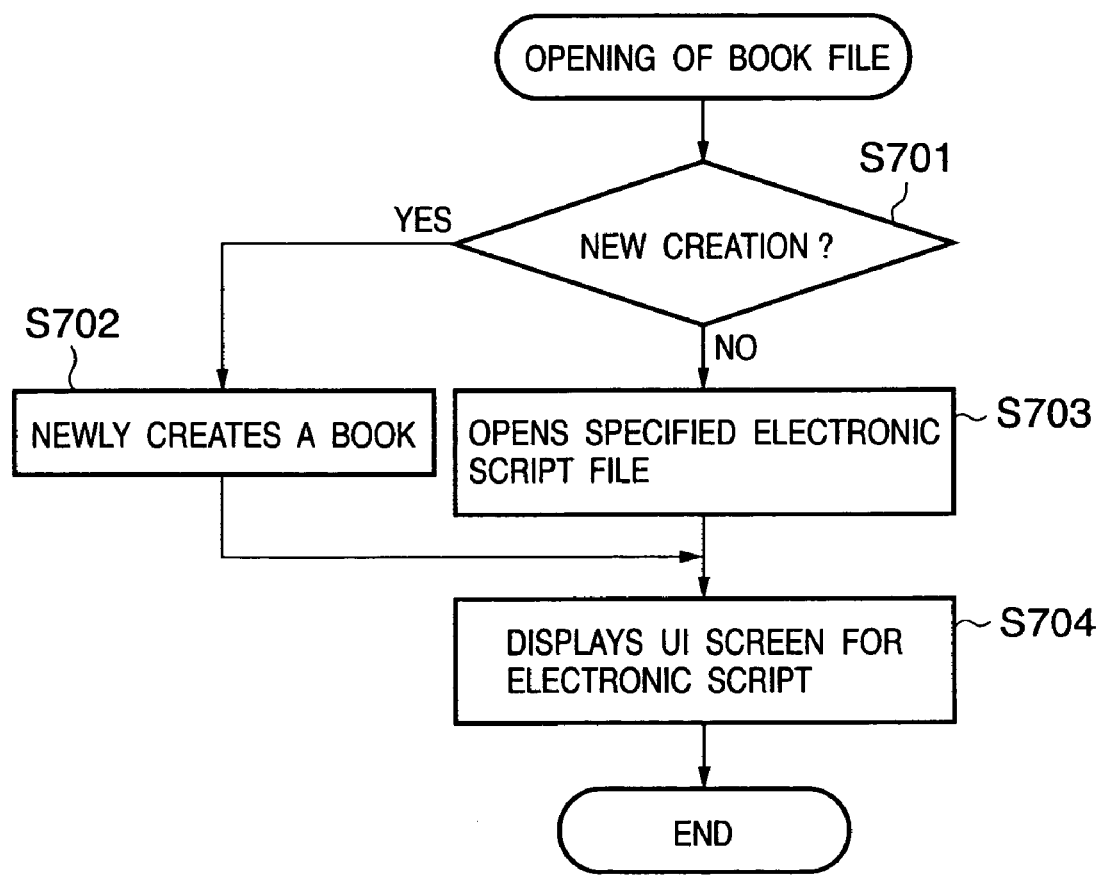
FIG. 7 is a flowchart illustrating a procedure for opening a book file according to this embodiment.

FIG. 7 is a flowchart illustrating the procedure for opening a book file with the bookbinding application 104 according to this embodiment.

First, at step S701, it is determined whether the book file to be opened is a book file to be newly created or an existing book file. In the case of a book file to be newly created, at step S702, a book file without a chapter is newly created. If shown by the example of FIG. 3A, this book file to be newly created should have only the book node 301 without any link to a chapter. In this case, a set of properties presupplied for new creation are applied as the book properties. Then, at step S704, a user interface (UI) screen for editing a new book file is displayed.

Figure 11:
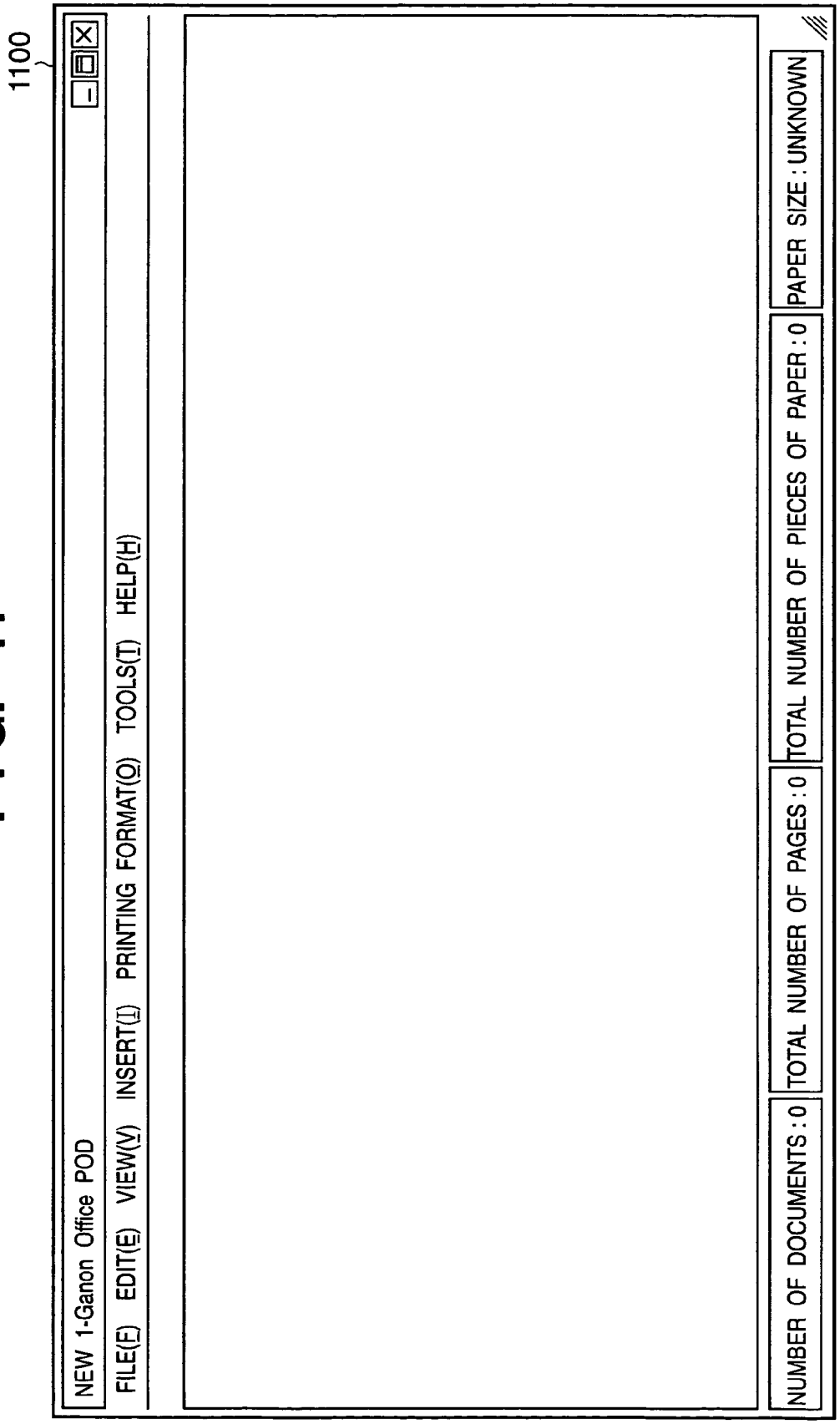
FIG. 11 shows an example of a user interface screen to be displayed when a new book file is opened.

FIG. 11 shows an example of a UI screen to be displayed when a new book file is created. In this case, since the book file does not have substantial contents, nothing is displayed on the UI screen 1100.

On the contrary, if there is any existing file at step S701, then at step S703, the specified book file is opened and a user interface (UI) screen is displayed based on the structure, the properties and the contents of the book file.

Figure 10:
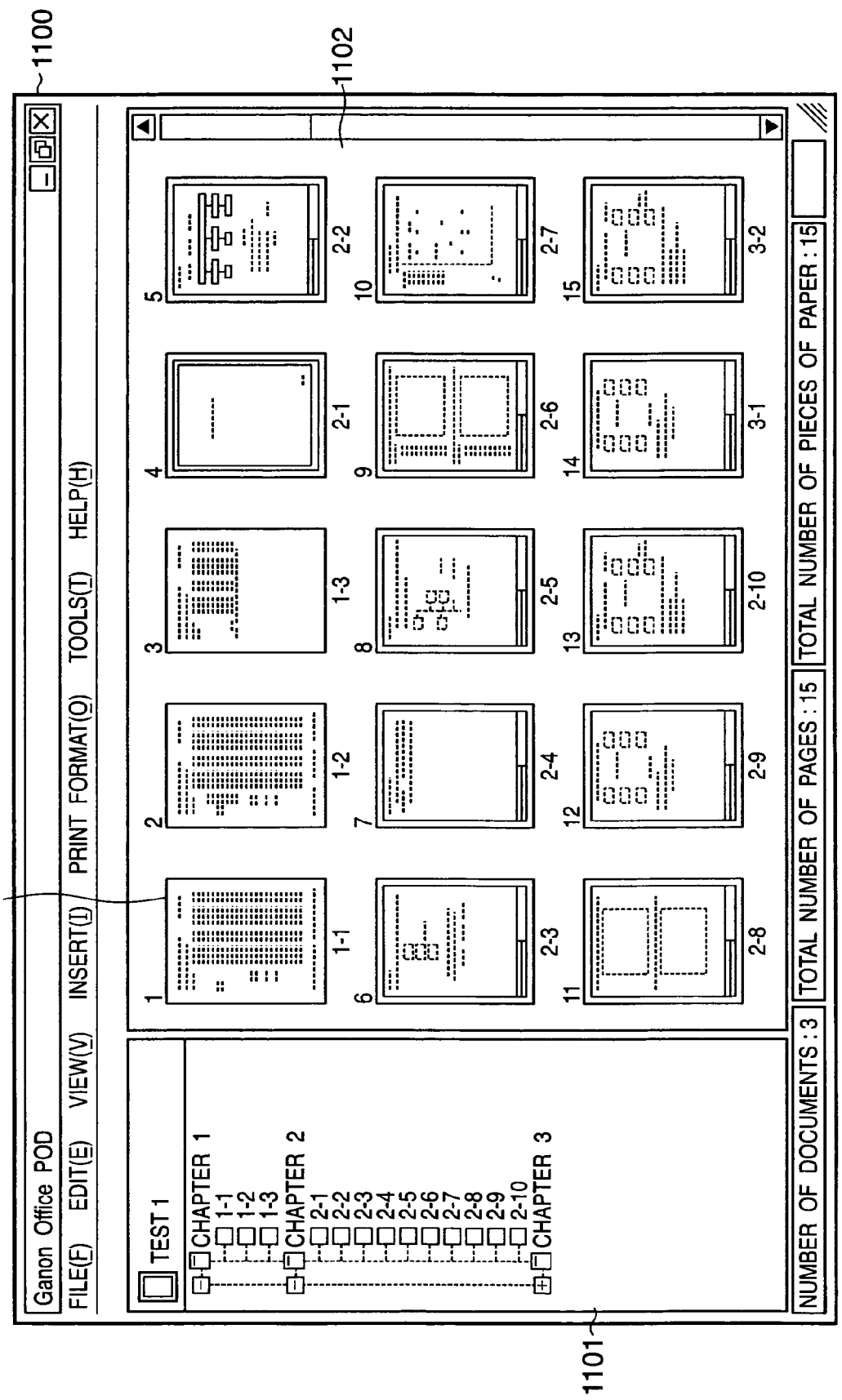
FIG. 10 shows an example of a user interface screen to be displayed when an existing book file is opened.

FIG. 10 shows an example of the displayed UI screen. The UI screen 1100 includes a tree section 1101 for showing the structure of the book and a preview section 1102 for displaying printed appearances. In the tree section 1101, chapters included in the book and pages included in each chapter are displayed as a tree structure as shown in FIG. 3A. In the tree section 1101, there are displayed page numbers, which indicate the numbers of script pages. In the preview section 1102, the contents of the print pages are reduced and displayed. The order of the display reflects the structure of the book.

Application data converted into an electronic script file by the electronic script writer 102 can be added as a new chapter to the opened book file. This function is called an "electronic script import function". By importing the electronic script to the book file which has been newly created in accordance with the procedure shown by the flowchart of FIG. 7 described above, the book file is given the substance. This function is activated by a drug-and-drop operation of the application data on the screen of FIG. 10.

Figure 8:
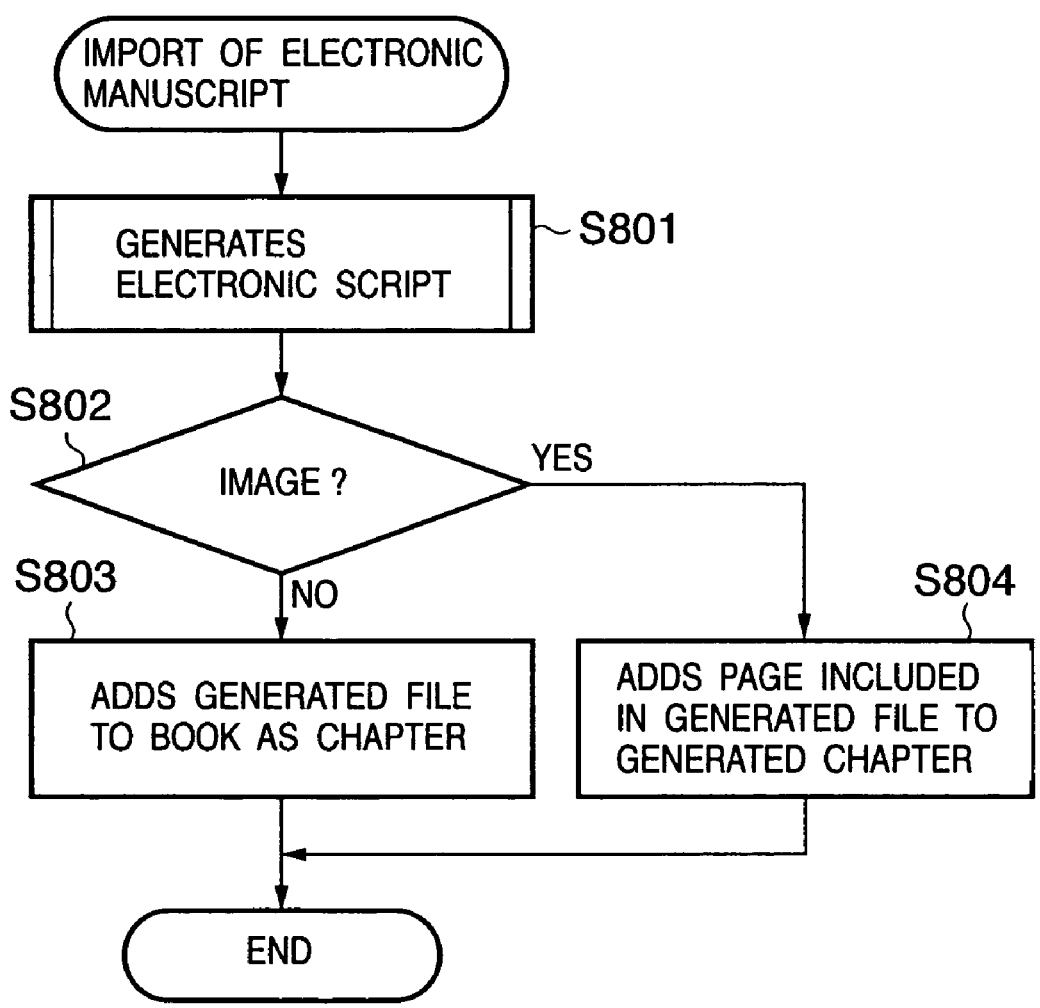
FIG. 8 is a flowchart illustrating a procedure for importing an electronic script file into a book file, according to this embodiment.

FIG. 8 is a flowchart showing a procedure for importing an electronic script according to this embodiment.

First, by activating the application program with which the specified application data has been generated and specifying the electronic script writer 102 as the device driver to print the application data, the application data is converted into electronic script data (step S801). After the conversion into the electronic script data, at step S802, it is determined whether the converted data is image data or not. Under the Windows® OS, the determination can be based on the file extension of the application data. For example, if the extension is "bmp", the data can be determined to be Windows® bitmap data. If the extension is "jpg", the data can be determined to be JPEG-compressed image data; and if the extension is "tiff", TIFF-format image. In the case of such image data, the electronic script file can be generated immediately from the image data without activating an application as done at step S801, and accordingly the processing at step S801 can be skipped.

If it is determined that the converted data is not image data at step S802, then at step 803, the electronic script file generated at step S801 is added to the book of the book file currently opened as a new chapter. In this case, as for chapter properties corresponding to the book properties, the values in the book properties are copied, and as for chapter properties other than these chapter properties, presupplied default values are set.

If it is determined that the converted data is image data at step S802, then at step S804, script pages included in the electronic script file generated at step S801 are added to a specified chapter without adding a new chapter in principal. However, if the book file is a newly created file, then a new chapter is created and the pages included in the electronic script are added as pages which belong to the chapter. In this case, as for page properties corresponding to the properties in an upper layer, the properties in the upper layer are given, and as for page properties defined for the application data and inherited to the electronic script file, the inherited values are given. For example, if the "specification of N-up print" is set for the application data, the property value is inherited. In this way, a new book file is created, or a new chapter is added.

Figure 9:
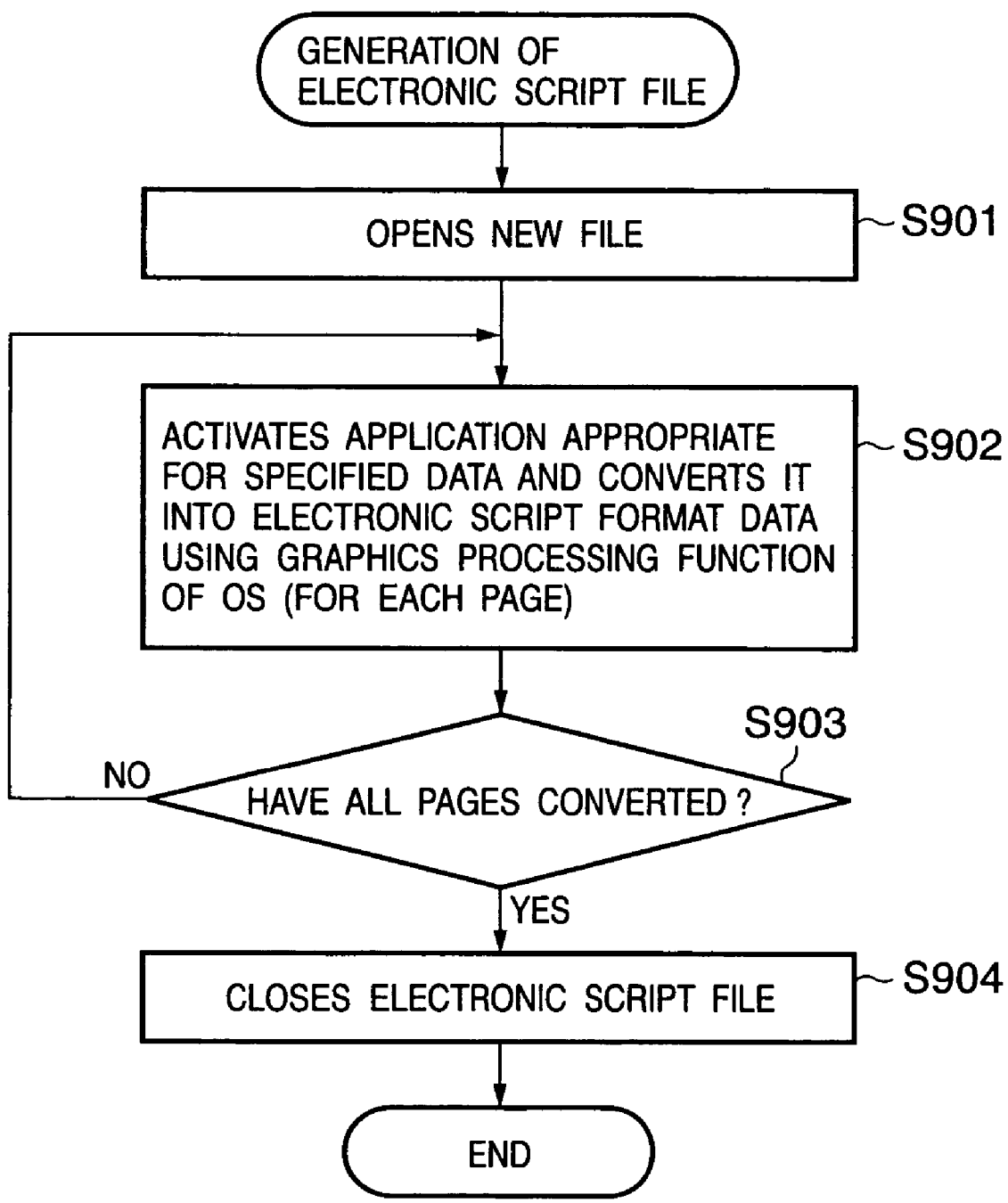
FIG. 9 is a flowchart illustrating a procedure for converting application data into an electronic script file, according to this embodiment.

FIG. 9 is a flowchart showing a procedure for generating an electronic script file with the electronic script writer 102 at step S801 of FIG. 8.

Figure 3B:
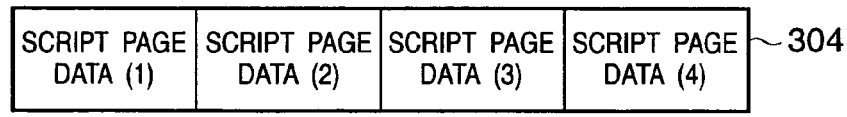
FIG. 3B shows a configuration of script data.

First, at step S901, a new electronic script file is created and opened. Then, at step S902, an application appropriate for the specified application data is activated to send an output command to the output module of the OS with the electronic script writer 102 as the device driver. The output module causes the received output command to be converted into electronic script type data and outputted by the electronic script writer. In this case, the output destination is the electronic script file opened at step S901. Then, at step S903, it is determined whether all the specified data has been converted. If conversion has been completed, then, at step S904, the electronic script file is closed. Thus, the electronic script file generated by the electronic script writer 102 is the file including the substance of the script page data, which is shown in FIG. 3B and described above.

<Editing of Book File>

As described above, a book file can be created from application data. The following editing operations can be performed for the chapters and pages of the generated book file.
(1) New addition;
(2) Deletion;
(3) Copying;
(4) Cutting;
(5) Pasting;
(6) Moving;
(7) Change of chapter name;
(8) Renumbering of pages;
(9) Insertion of cover;
(10) Insertion of slip paper;
(11) Insertion of index paper; and
(12) Page layout for each script page.

In addition, the operation of canceling the editing operation once performed and the operation of redoing a cancelled operation are also available. These editing functions enable editing operations such as integration of multiple book files, rearrangement of chapters or pages in a book file, deletion of chapters and pages in a book file, modification of layout of script pages and insertion of slip paper or index paper. By performing these operations, the operation results are reflected on the properties shown in FIGS. 4A to 6 or on the structure of the book file. For example, if the operation of adding a new blank page is performed, then a blank page is inserted at the specified position. This blank page is treated as a script page. If the layout for a script page is modified, then the modification is reflected on the properties such as the "printing method", "N-up print", "cover/back cover" "index paper", "slip paper" and "chapter separation".

<Output of Book File>

The final goal is to printout the book file created and edited as described above. When the user selects "File" from the menu of the UI screen 1100 of the bookbinding application shown in FIG. 10 and selects "Print" therefrom, printing is performed by a specified output device. In this case, the bookbinding application 104 first creates a job ticket from the book file currently opened and passes it to the electronic script despooler 105. The electronic script despooler 105 then converts the job ticket into the output command of the OS, for example, a GDI command of Windows®, and sends it to the output module, for example, a GDI. The output module causes the specified printer driver 106 to generate a command appropriate for the output device and sends it to the output device.

The job ticket is data having a structure with a script page as the minimum unit. The data structure of the job ticket defines the layout of a script page on paper. One job ticket is issued for one job. Accordingly, there is a node called a "document" at the highest layer, and properties for the entire document, such as "two-sided pint/single-sided print", are defined there. Below the node, there are paper nodes including properties such as an identifier of paper to be used and specification of a paper feed port of a printer. To each paper node there belong nodes of sheets to be printed on the paper. A sheet corresponds to a piece of printing paper, and print pages (physical pages) belong to each sheet. In the case of single-sided printing, one physical page belongs to one sheet, and in the case of two-sided printing, two physical pages belong to one sheet. To each physical page, there belongs a script page to be arranged thereon. The properties of a physical page include layout of a script page.

The electronic script despooler 105 converts the above-mentioned job ticket into an output command to be sent to the output module.

<Other System Configurations>

The outline of the document processing system according to this embodiment has been described. Though the system is of a stand-alone type, a book file with almost the same configuration can be also created and edited in almost the same procedure in a server-client system obtained by extending the above system. In this case, however, a book file and print processing is managed by the server.

Figure 12:
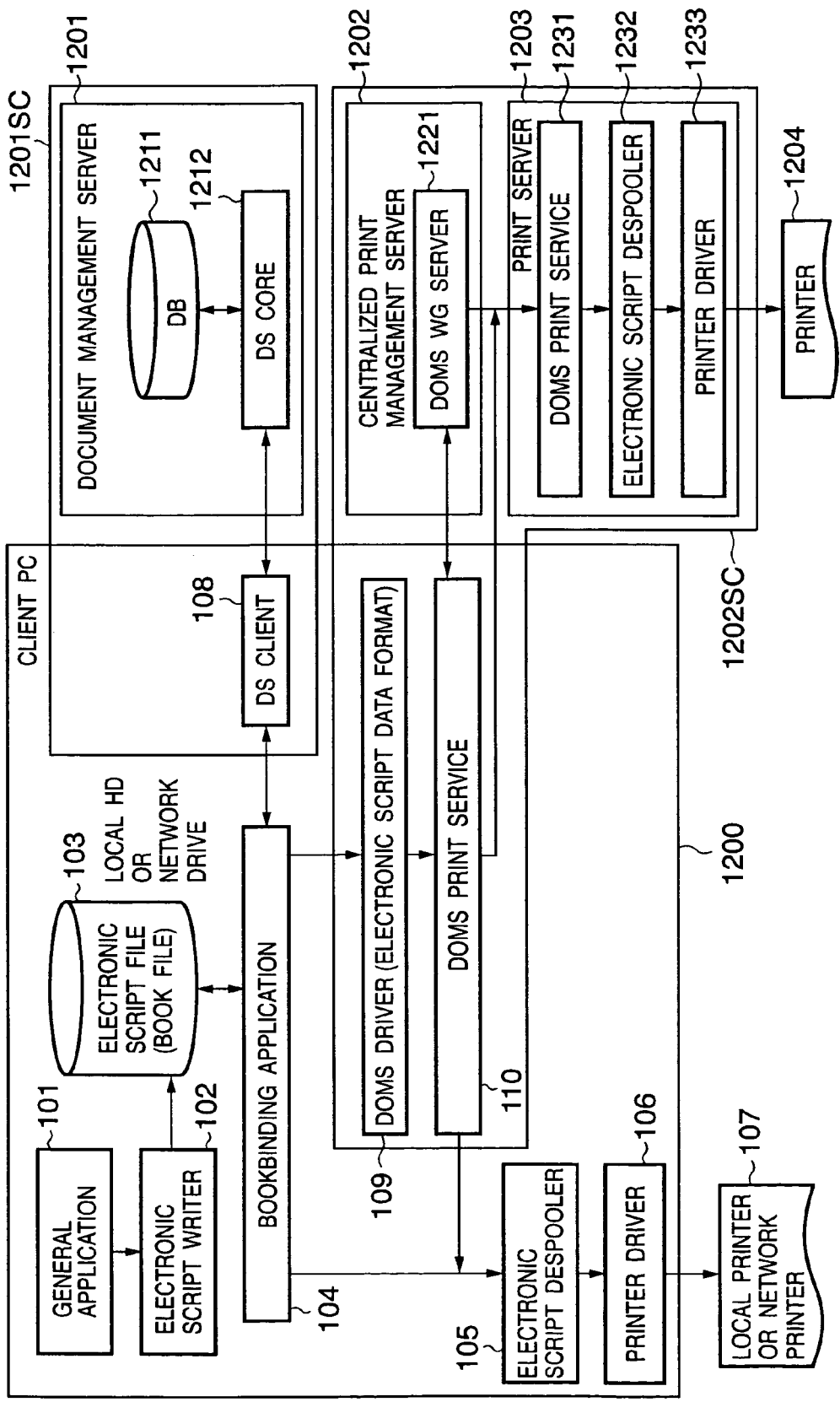
FIG. 12 is a block diagram showing a configuration of a client-server type document processing system according to this embodiment.

FIG. 12 is a block diagram showing a configuration of a server-client type document processing system according to this embodiment.

A client document processing system 1200 has the configuration of the stand-alone type system, further including a DOMS (Document Output Management Service) driver 109 and a DOMS print service module 110, which are client modules, and a DS (document service) client module 108. To this client document processing system 1200, there are connected a document management server 1201, a centralized print management server 1202 and a print server 1203. Though these servers are generally connected to the client document processing system 1200 via a network, they are connected via communication between processes simulating communication between networks when functioning as a client at the same time. Though both of the document management server 1201 and the centralized print management server 1202 are connected to the client in FIG. 12, only one of them may exist on the network. When the connected server is a document management server, a document management server-client system 1201SC which includes its client module is added to the stand-alone type document management system, and when the connected server is the centralized print management server 1202, a print management server-client system 1202SC which includes its client module is added to the stand-alone type document management system.

The document management server 1201 is a server for storing a book files created and edited by the bookbinding application 104. When book files are managed by the document management server 1201, they are stored in a database 1211 of the document management server 1201 instead of or in addition to the local HD of the client PC. Storage and reading of a book file between the bookbinding application 104 and the document management server 1201 is performed via the DS client 108 and a DS core 1212.

The centralized print management server 1202 is a server for managing printing of a book file stored in the client document processing system 1200 or the document management server 1201. A print request from the client is sent to a DOMSWG server module 1221 of the centralized print management server 1202 via the DOMS driver 109 and the DOMS print service module 110. When printing is performed by the printer 107 of the client, the centralized print management server 1202 passes electronic script data to the electronic script despooler 105 via the DOMS print service module 110 of the client.

When printing is performed by the print server 1203, the electronic script data is sent to a DOMS print service module 1231 of the print server 1203. The centralized print management server 1202 performs a security check on the qualification of the user who has issued the print request or stores the print processing log for a stored book file, for example. Thus, the document processing system can be realized both as a stand-alone system and as a client-server system.

<Contents of Preview Display>

As described above, when a book file is opened by a bookbinding application, the user interface screen 1100 shown in FIG. 10 is displayed. A tree showing the structure of the opened book (hereinafter referred to as an "book of interest") is displayed in the tree section 1101. There are supplied three kinds of display methods for display in a print preview section 1102 according to specification of the user. A first display method is a "script view mode" in which script pages are displayed as they are. In this "script view mode", the contents of the script pages belonging to the book of interest are reduced and displayed. In this case, the layouts of the scripts are not reflected on the display in the preview section 1102. A second display method is a "print view mode". In this "print view mode", script pages are displayed in the preview section 1102 with the layouts thereof reflected. A third display method is a "simple print view mode". In this "simple print view mode", the contents of each script page are not reflected on the display in the preview section 1102, and only its layout is reflected.

By selecting the "print format" from the menu on the screen of FIG. 10, the print settings can be modified. From the submenu, the operator can select for which of a page, a chapter and a book the settings should be modified. When any of them is selected, there is displayed a screen for changing print setting items included in the properties of the selected hierarchy, for example, the book properties if a book is selected. The displayed screen is a screen for enabling setting of the items shown in any of FIGS. 4A to 6 according to the selected attribute hierarchy. The operator can input desired print settings on the screen. The print settings inputted by the operator are stored as part of the attributes shown in any of FIGS. 4A to 6 according to the specified hierarchy.

As for an item which can be redundantly set among multiple hierarchies, it is first specified in the properties at a lower layer that the item is "exceptionally specified" and then a value is specified for the item. For example, the item of paper direction included in the chapter properties in FIG. 5 is also included in the book properties redundantly. Accordingly, if the "print direction" is specified as an exception to the book in the chapter properties, the "print format" is selected from the menu in FIG. 10, and then the "specification of chapter" is selected from the submenu. Furthermore, the operator specifies the "exceptionally specified" for the "print direction" on the user interface screen displayed then, and after that, sets a desired paper direction for the chapter.

In this way, even during editing of a document, the operator can make print settings for the book, each chapter and each page with desired values. The procedure for print settings is only an example, and, as far as the present invention is concerned, any procedure may be possible after all only if the setting values are reflected in FIGS. 4A to 6 and also reflected on the printing result.

Prior to describing the features of the embodiment of the present invention, description will be now made on a configuration of a document processing system having a host computer 100 (corresponding to the information processor of this invention) and a printer 107, which is applicable to this embodiment. The configuration of the host computer 100 (may also be referred to as a client, hereinafter) is similar to that described with reference to FIG. 2. Therefore, the common portions are denoted by the same reference numbers and the description thereof is omitted. Both of a local printer connected to the client and a printer 1204 (FIG. 12) connected to the server may be applicable as the printer 107.

<Document Processing System of this Embodiment>

Figure 13:
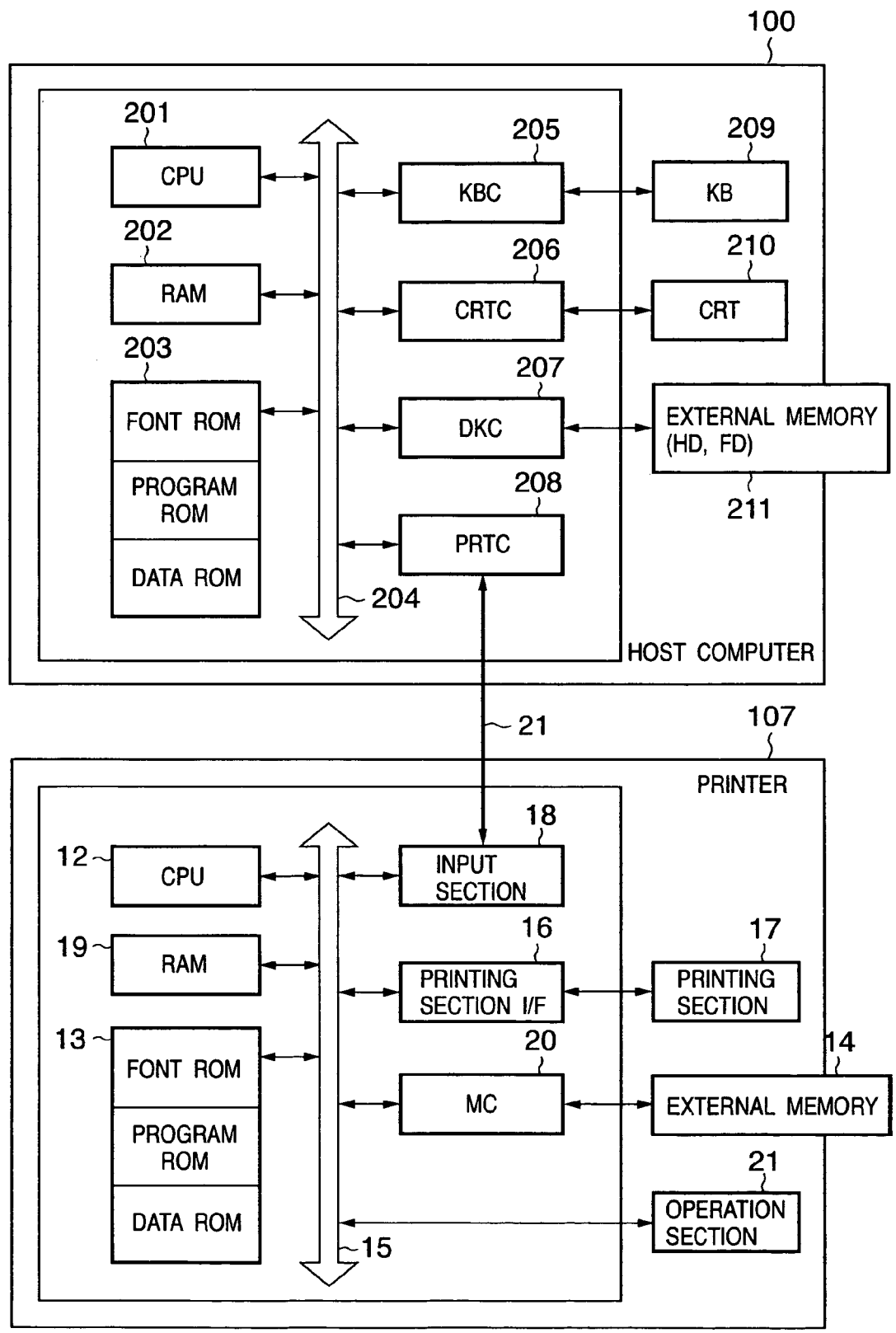
FIG. 13 is a block diagram for illustrating configurations of a host computer and a printer in the document processing system according to this embodiment.

FIG. 13 is a block diagram for illustrating the configuration of the document processing system according to the embodiment of the present invention. The present invention can be applied to any of stand-alone equipment, a system constituted by multiple pieces of equipment and a system connected and processed via a network such as a LAN and a WAN only if the functions according to this embodiment can be executed. The configuration of the host computer 100 is similar to that described with reference to FIG. 2, and therefore the description thereof is omitted.

The printer 107 is controlled by a CPU 12. The CPU 12 outputs an image signal as output information to a printing section (printer engine) 17 connected to a system bus 15 based on a control program stored in the ROM for programs of a ROM 13 or a control program stored in an external memory 14 and loaded to a RAM 19. In the ROM for programs of the ROM 13, there is stored a control program of the CPU 12. In the ROM for fonts of the ROM 13, there is stored font data and the like to be used when the above-mentioned output information is generated. In the ROM for data of the ROM 13, there is stored information and the like to be used by the host computer 100 in the case of a printer which is not provided with the external memory 14 such as a hard disk.

The CPU 12 can communicate with the host computer 100 via an input section 18 and can notify information on the printer 107 to the host computer 100. The RAM 19 functions as a main memory, a work area and the like for the CPU 12, and configured to enable expansion of the amount of its memory with an optional RAM to be connected to an added port not shown. The RAM 19 is used as an area for development of output information, an area for storing environmental data, an NVRAM and the like. Access to the above-mentioned external memory 14, such as a hard disk (HD) and an IC card, is controlled by a memory controller (MC) 20. The external memory 14 is connected as an option to store font data, an emulation program, form data and the like. On an operation panel 21, there are arranged switches, LED indicators and the like for operation.

The number of the above-mentioned external memories 14 is not limited to one, and multiple external memories 14 can be provided. The system may be configured so that the multiple external memories storing programs for interpreting option cards and printer control languages of different language systems in addition to internal fonts can be connected thereto. Furthermore, an NVRAM not shown may be provided to store printer mode setting information from the operation panel 21.

The host computer 100 is assumed to have the file, applications, despooler and driver described above with reference to FIG. 1. The electronic script file 103 is generated from the document file generated by the application 101 (application data) via the electronic script writer 102. The electronic script file 103 can be opened by the bookbinding application 104 as described above, and the bookbinding application 104 displays an operation screen, for example, as shown in FIG. 10 on the display section 210. The major difference between the bookbinding application 104 and the general application 101 is that the bookbinding application 104 has a print setting function which usually should be provided by the printer driver 106. Due to this print setting function, the bookbinding application 104 can make function settings of the printer 107, such as stapling and punch holes, for an electronic script file in addition to editing functions such as modification of the page order of a document, reproduction (copy) and deletion and can perform printing using a specified printer, unlike the general application 101. The bookbinding application 104 described in this embodiment is also called a print setting application.

<Template Function>

Description will be now made on a template function provided by a prior-art bookbinding application 104. As described above, the bookbinding application 104 can create a document file having the properties shown in FIGS. 4A and 4B by making settings, such as output paper, page layout and bookbinding, for an electronic script file generated via the electronic script writer 102 and editing the electronic script file. Furthermore, there is provided a function registering the setting information as a template to enable a desired template to be selected from templates prepared in advance when creating a new document.

The template data is registered with the registry of the client PC and managed. The bookbinding application 104 also provides an editing function enabling a user to arbitrarily modify the template data. A registry is a file storing information such as environmental settings for various applications and specification of a driver. In the case of Windows® operating system, the registry is stored as a binary file and therefore cannot be modified with a general text editor. The bookbinding application 104 has a function of reading the binary file to present it as editable data to a user and enable him edit it.

Furthermore, the bookbinding application 104 is provided with a function of storing the template information as a file as well as an import/export function enabling the template file to be taken out to or brought in from a different PC.

Figure 14:
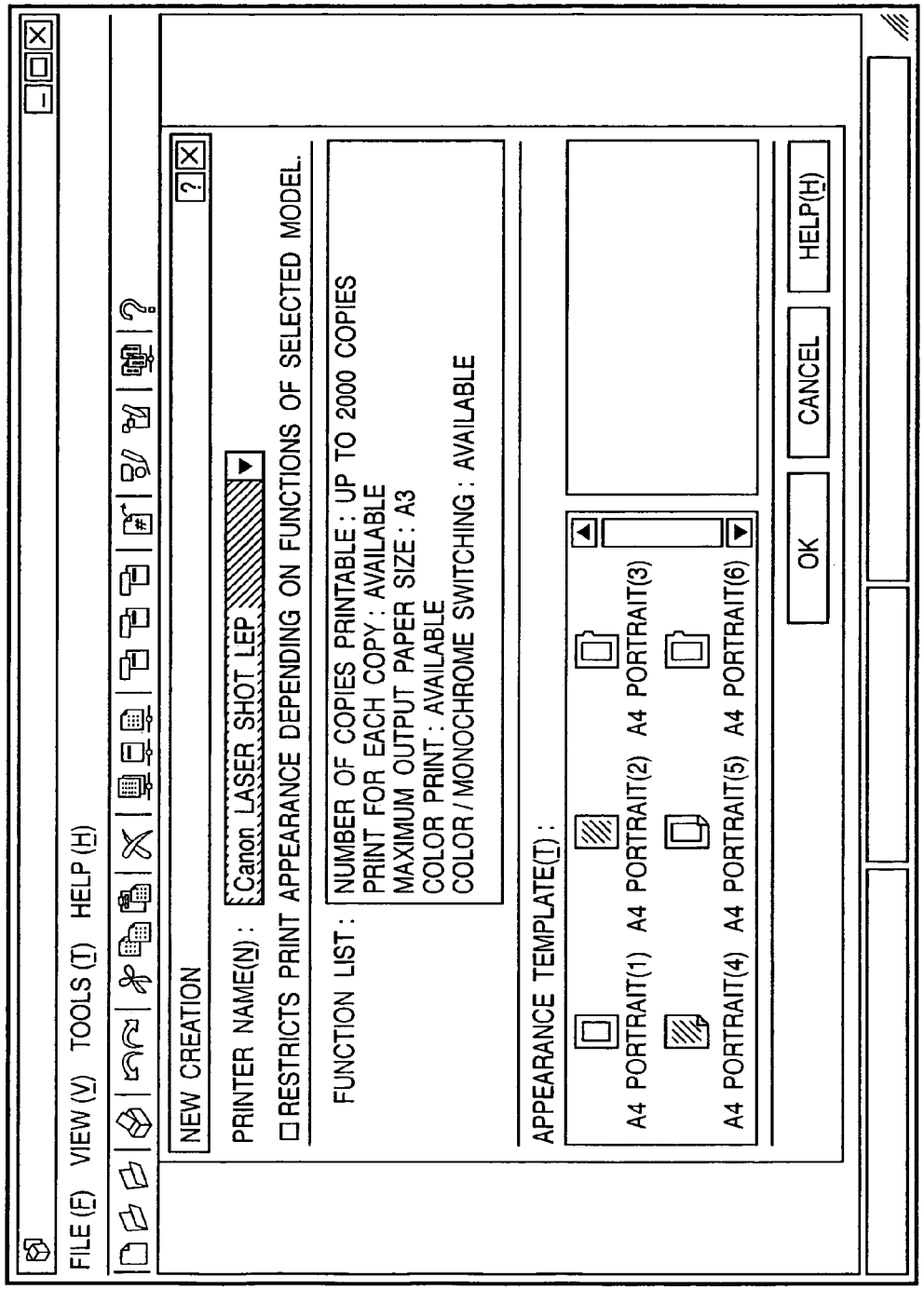
FIG. 14 shows an example of a prior-art user interface screen for selecting a template in the document processing system according to this embodiment.

FIG. 14 is a display example of a window for selecting a template to be displayed by the bookbinding application 104 when generating a new document file. The user can select a desired template from among templates supplied for the bookbinding application 104 on this screen.

Figure 15:
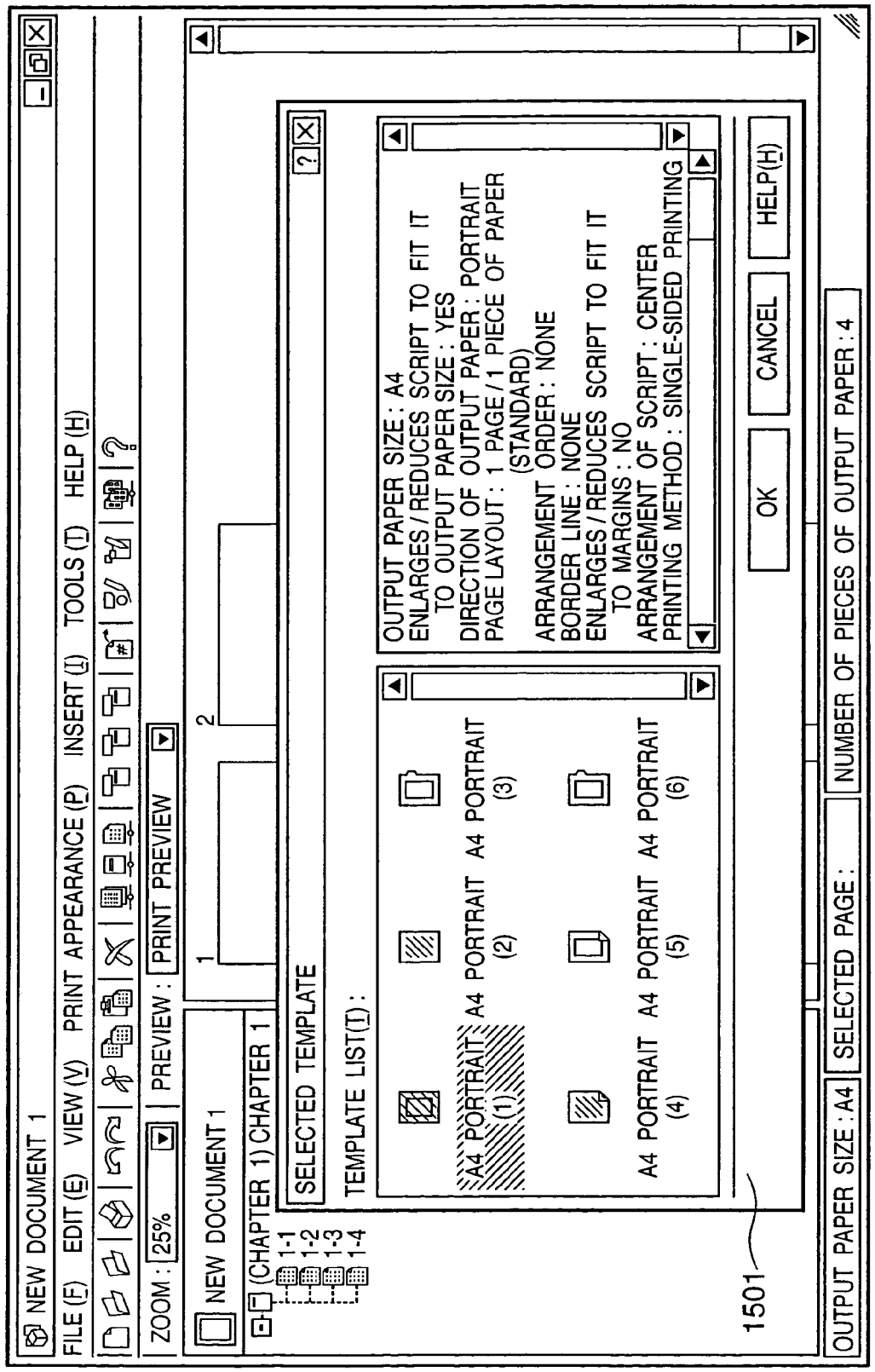
FIG. 15 shows a prior-art user interface screen for selecting a template in the document processing system according to this embodiment.

FIG. 15 is a display example of a "template selection" window 1501 for changing the current template during editing of a document file with the bookbinding application 104. The user can also modify the template during editing within this window. Furthermore, the user can create and register a template.

<Prior-Art Template Setting Operation>

Figure 16:
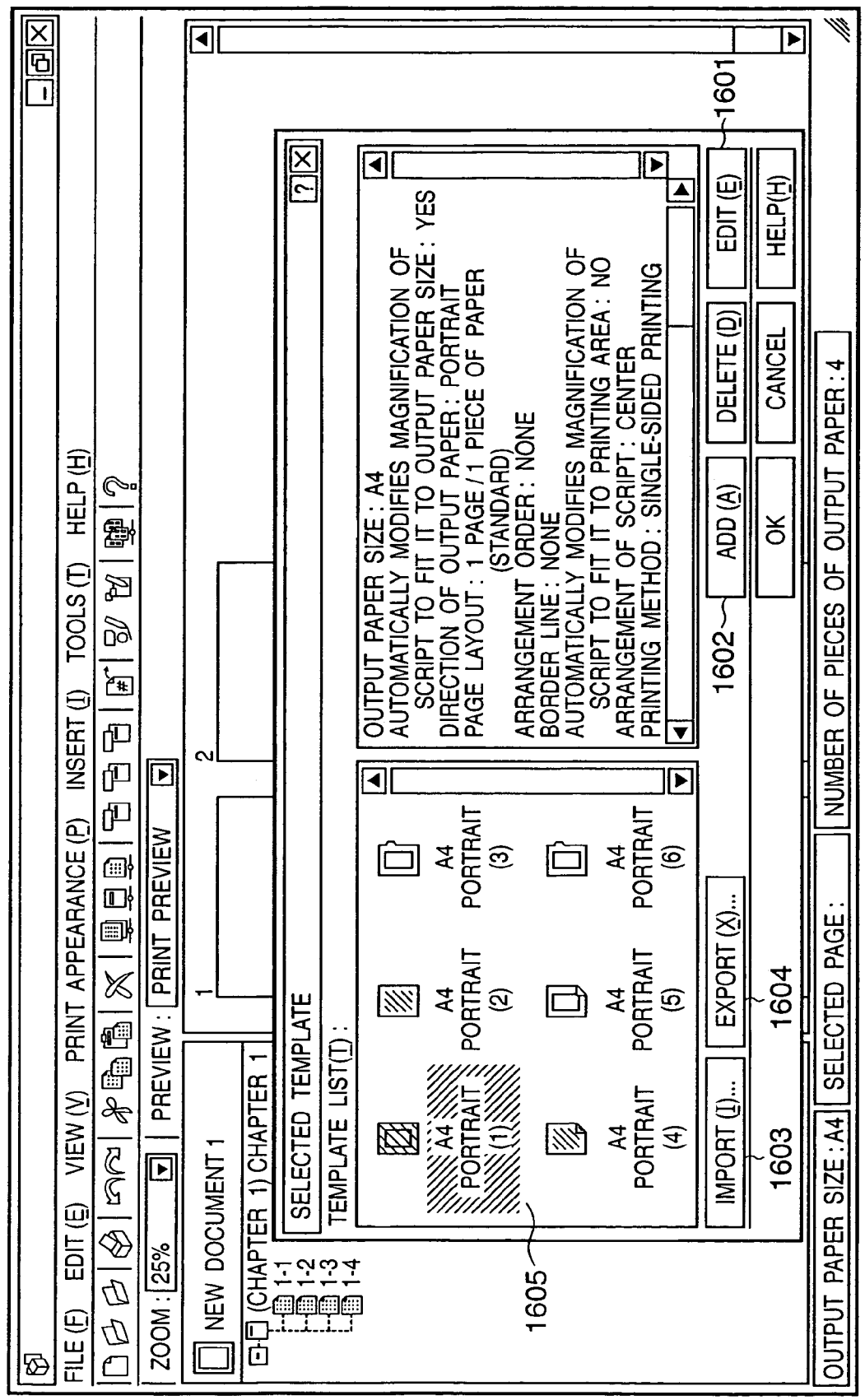
FIG. 16 shows a prior-art user interface screen for setting a template in the document processing system according to this embodiment.
Figure 17:
FIG. 17 shows an example of a prior-art user interface screen for editing a template in the document processing system according to this embodiment.

FIG. 16 is a display example of a "template setting" window for editing a template with the bookbinding application 104. In a list display section 1605, a list of templates supplied for the bookbinding application 104 is displayed. When the operator selects a template and clicks an "edit" button 1601 here, the template editing screen in FIG. 17 is displayed, where settings for the selected template can be freely modified. When an "add" button 1602 is clicked, the "template editing" screen in FIG. 17 is also displayed. The settings for the template displayed here show default values ("1 UP", "single-sided" and "without finishing"). The user can then specify a new template name and modify each of the settings to create a new template and register it with the client PC.

By selecting an export button 1604 on the user interface screen in FIG. 16, the template information registered with the registry of the client PC can be stored as a file. By selecting an import button 1603, the template file can be newly registered with the registry of the client PC.

In this prior-art system, however, when the user generates a new template, the only way provided for him is to modify property values of a template originally registered with the application into ones he desires or to newly create a template with default values (settings such as "1 UP", "single-sided" and "without finishing") as initial values.

<Creation of a Template Utilizing Setting Values for a Document Being Edited>

Description will be now made on a function of creating a template utilizing setting values for a document file being currently edited, according to the present invention.

Figure 18:
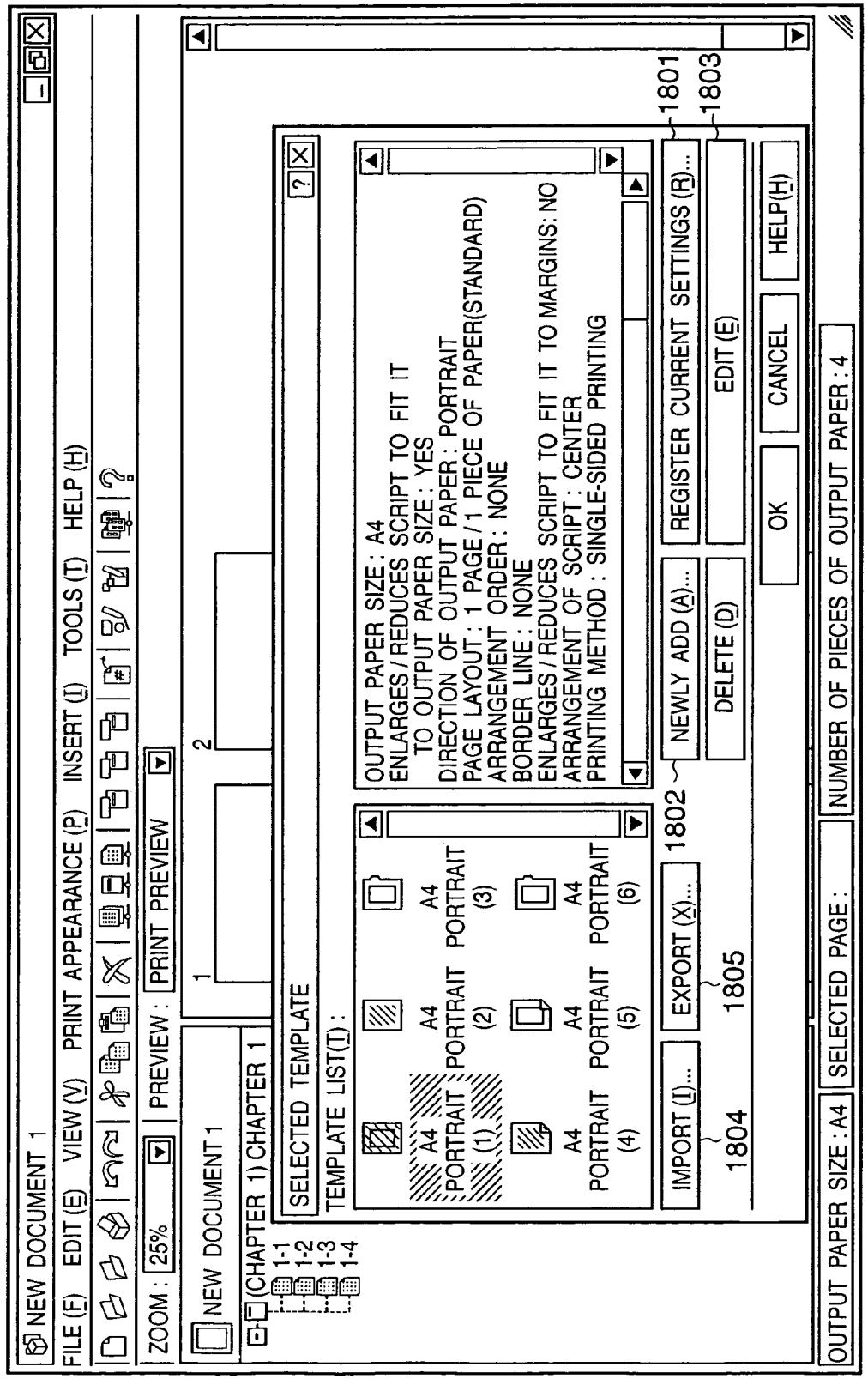
FIG. 18 shows an example of a user interface screen for setting a template in the document processing system according to the embodiment of the present invention.
Figure 19:
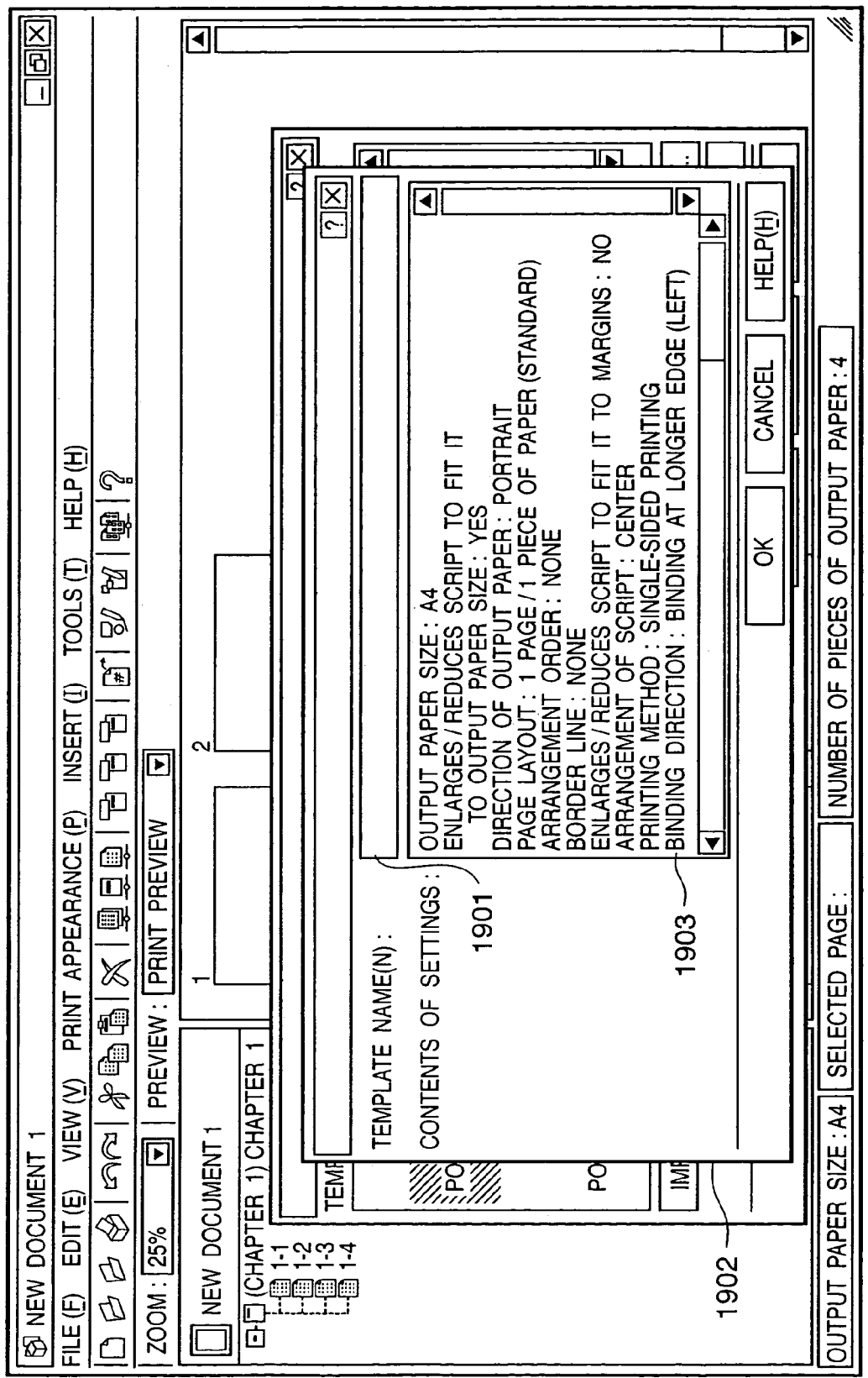
FIG. 19 shows an example of a user interface screen for setting a template in the document processing system according to this embodiment.

FIG. 18 is an example of the "template setting" window displayed during editing of a document file with the bookbinding application 104. A "newly add" button 1802 has the same function as the "add" button 1602 in FIG. 16. A "delete" button 1802, an "edit" button 1803, an "import" button 1804 and an "export" button 1805 also have the same functions as traditional buttons. However, a "register current settings" button 1801 is newly added, unlike the prior art. By clicking this button, a "register current settings" window 1902 in FIG. 19 is displayed. In a display section 1903 for "contents of settings" shown in the "register current settings" window 1902, there are displayed the contents set in the document being currently edited, and the user can create a template based on the settings for the document file being currently edited only by specifying a template name 1901.

The user interface screens and operation procedures described above makes it possible to store a document file being currently edited as a template and to create a new document utilizing a template. Description will be now made on the procedure to be performed by the print control application 104 and the contents of a template.

Figure 20:
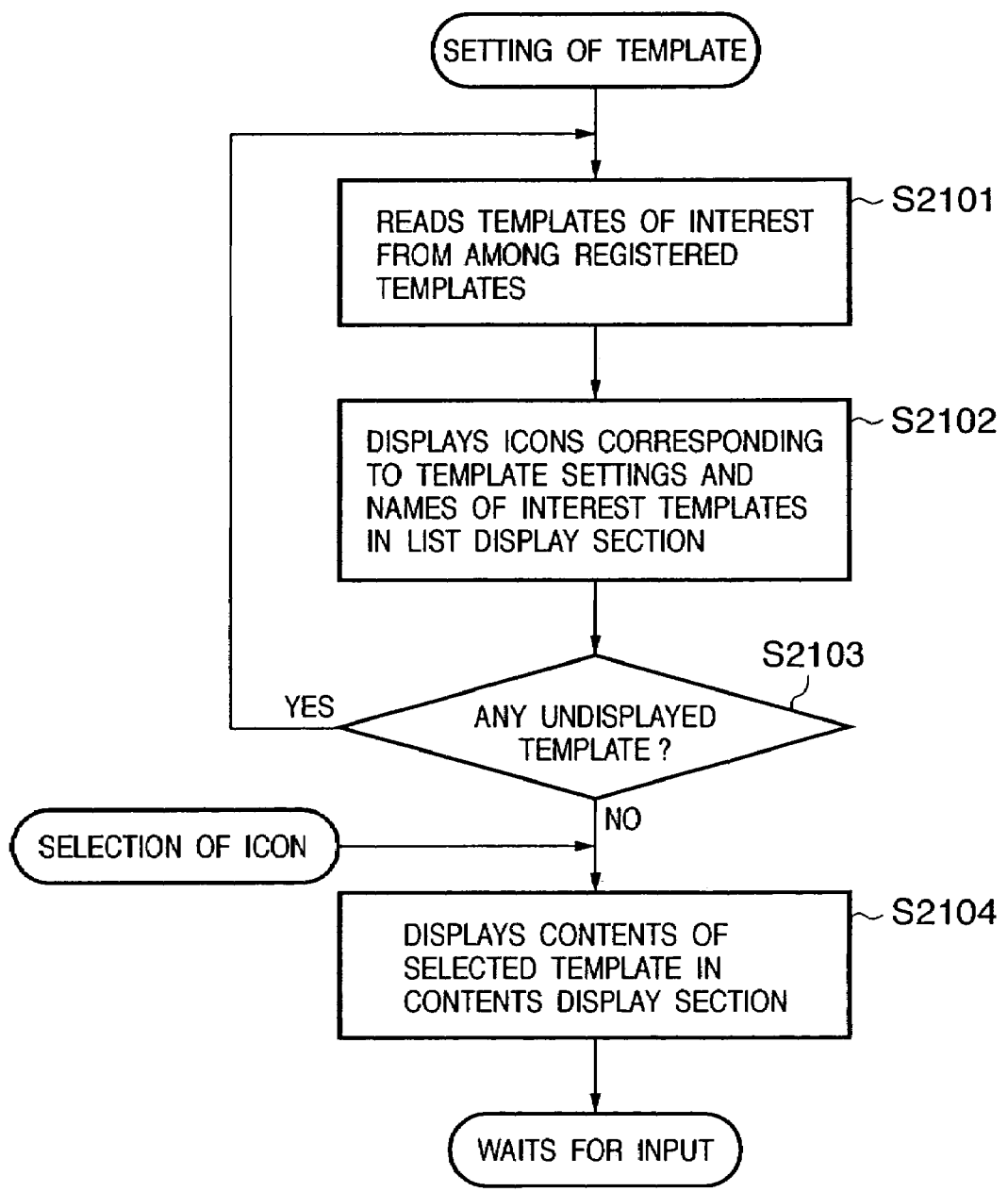
FIG. 20 is a flowchart of a procedure for setting a template with a bookbinding application in the document processing system according to this embodiment.

In this embodiment, a template is the book properties shown in FIGS. 4A and 4B themselves. That is, setting items included in a template correspond to the items included in the book properties shown in FIGS. 4A and 4B. According to the above-mentioned operations, the book properties of a document file having the structure shown in FIGS. 3A and 3B and being currently edited from the electronic script file 103, converted into a format to be stored in the registry as required, and then registered with the registry. FIG. 20 is a flowchart of a template setting procedure to be performed with the bookbinding application 104 when the operator selects "template setting" from the menu.

First, attention is paid to registered templates in a predetermined order and the contents of a template of interest are read (S2101). The contents of the template, that is, icons based on print settings and the name of the template of interest is displayed in a template list display section (S2102). The template list display section corresponds to the "template list" window in FIG. 18. Each icon and template to be displayed corresponds to each icon displayed in the template list. In this case, based on settings such as the "two-sided printing/single-sided printing", with or without "index paper", "paper direction" and the like, an icon intuitively indicating the settings is selected and displayed. This step is repeated by sequentially paying attention to a different template until there is not any undisplayed template (S2103). These icons and template data are linked, and when an icon is selected, a corresponding template is uniquely determined.

When display of the "template list" is finished, the contents of settings for the template selected then is displayed in a contents display section (S2104). The contents display section is a display section on the right side of the "template list" of FIG. 18, and a specific value is displayed for each setting item (property item in the case of FIGS. 4A and 4B) included in the selected template. In the example of FIG. 18, it is set for the selected template named "A4 portrait (1)" that the paper size is A4, the paper direction is "portrait", and the page layout (N-up print in the case of FIGS. 4A and 4B) is 1 page/sheet, and these setting value are displayed.

When the operator selects a desired icon from the template list after the screen of FIG. 18 is displayed, the step S2104 is repeatedly executed for the newly selected icon and the contents of a corresponding template are displayed.

Figure 21:
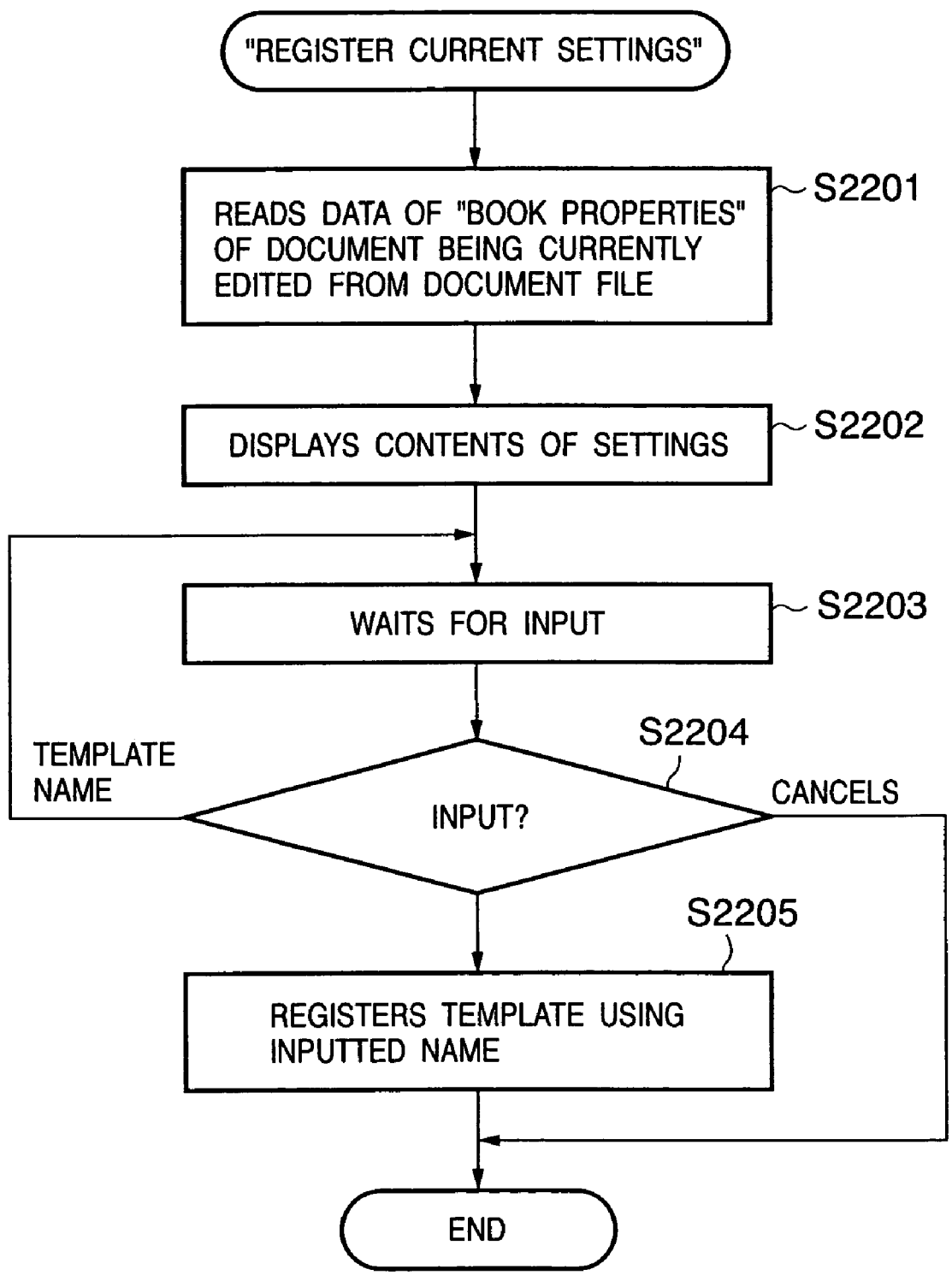
FIG. 21 is a flowchart of a procedure for setting a template with a bookbinding application in the document processing system according to this embodiment.

By clicking the "register current settings" button 1801 on the screen of FIG. 18, the process of FIG. 21 is executed by the bookbinding application.

First, "book properties" (see FIGS. 4A and 4B) set for the document (book) being currently edited are read from the electronic script file 103 (S2201). The contents of the settings are displayed in the display section 1903 for the "contents of settings" in the "register current settings" window 1902 shown in FIG. 19 (S2202).

The process then waits for input by the operator (S2203). If input is received, the contents of the input are determined (S2204). When the template name 1901 is inputted, the process waits for the next input. If an "OK" button is clicked, the book properties read at step S2201 are registered with the registry as a template with the inputted template name given thereto (S2205). The registry includes hierarchically configured registry keys and entry values corresponding to the registry keys. Accordingly, a template is registered with a specified name as a subkey belonging to the registry key corresponding to the bookbinding application, for example, and each setting item name and its corresponding value are registered as entry values included therein.

If a template name has not been inputted at step S2205, then input thereof is prompted again. If a "cancel" button is clicked, the process ends, discarding the book properties which have been read.

Though the process waits for input in a sequence of processings in FIG. 21 for simplification of description, the task may be finished once to wait for an input.

As described above, the book properties for the document file being currently edited can be registered as a new template. As for such a template registered in this way, by specifying the "template selection" shown in FIG. 15 from the menu, the "template selection" window 1501 is displayed, and the icon of the template is displayed therein. When the operator selects the icon, a new document file is created, and the values of the setting items for the selected template are copies as the book properties for the new document.

This copy function is not limited to creation of a new document file, and book properties for an existing document file can also be replaced with the contents of a selected template.

The configuration and procedures described above makes it possible to create a template based on setting information on a document file being currently edited, in particular setting information included in the book properties in the document processing system according to this embodiment. This enables a user to save the trouble of newly making settings and performing editing to create a template and easily register a new template file.

In this embodiment, the program called a bookbinding application is an application having not only a function of bookbinding but also a function of improving the appearance of a document as desired by a user, and therefore it can also be called a document editing application based on the function.

Modification 1

In the embodiment described above, only the setting items included in the book properties are reflected on a template. However, values of the items included in the chapter properties (FIG. 5) or the page properties (FIG. 6) may be reflected on a template. In this case, a template can be created according to the method described below, which is shown as one example of such methods.

As shown in FIGS. 4A to 6, some of the setting items included in the properties of each hierarchy are mutually overlapped. When a different setting is made for such an overlapped item in higher and lower hierarchies, the setting made at the lower hierarchy shows an exceptional value. For example, all the items included in the chapter properties shown in FIG. 5 are overlapped with items in the book properties. As for the items included in the book properties, the values set for the items are applied to the entire document. However, if a different value is set in the chapter properties for any of the items, it means that an exceptional setting is set for the chapter, which is different from the value set in the book properties. For example, if the value of the "paper size" item included in the book properties for a document file A is "A4", and the value of the "paper size" item included in the chapter properties of a chapter Al belonging to the document file is "A3", then it means that the chapter Al is exceptionally printed as A3 though the entire document is printed with the print size A4. In this way, as for an overlapped item, if a value is set for the item at a lower hierarchy, the value takes precedence and the value at a higher hierarchy is ignored.

Accordingly, when a particular chapter is selected from chapters of a document being currently edited, the values of setting items included in the book properties are replaced with the setting values of the items which are included in the chapter properties of the selected chapter and overlapped with the items in the book properties, and stored as a template. As a result, though the items to be included in the template are those shown in FIGS. 4A and 4B, the setting values for the selected chapter are reflected on the values set there.

Thus, it is possible to easily create a template on which the chapter properties for a selected chapter of a document being currently edited are reflected.

Modification 2

The above variation is applicable to page properties. The relationship of the page properties with the chapter properties and the relationship with the book properties are similar to that between the chapter properties and the book properties described above. Accordingly, when a particular page is selected from pages of a document being currently edited, the values of setting items included in the book items are replaced with the setting values of the items which are included in the chapter properties of the chapter including the selected page and overlapped with the items in the book properties to create intermediate data, and, if different values are set for the overlapped items in the page properties for the selected page, the above-mentioned intermediate data is replaced with the setting values and then stored as a template. As a result, though the items to be included in the template are those shown in FIGS. 4A and 4B, the setting values for the selected page are reflected on the values set there.

Thus, it is possible to easily create a template on which the page properties for a selected page of a document being currently edited are reflected.

Modification 3

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. A document processing method wherein print setting information for printing a document is set, the method comprising:
   an importing step of importing the document;
   a setting step of setting the print setting information for the document imported in the importing step;
   an instructing step of instructing that the print setting information set in the setting step is registered as template information or that new print setting information is registered as template information;
   a displaying step of displaying a first setting screen including an item for setting a name of the template information and including the print setting information set in the setting step when the instructing step instructs that the print setting information set in the setting step is registered as template information, and displaying a second setting screen for setting the new print setting information when the instruction step instructs that the new print setting information is registered as template information;
   a registering step of registering the template information for the print setting information set in the setting step with the name set by using the first setting screen when the first setting screen is displayed in the displaying step, and registering the template information for the new print setting information set by using the second setting screen when the second setting screen is displayed in the displaying step; and
   a reading step of reading the template information registered in said registration step for the imported document or a new document.

2. The document processing method according to claim 1, further comprising a template editing step of editing the contents of a template registered in said registration step.

3. The document processing method according to claim 1, wherein the second setting screen contains an item in which a name of the template information is set and an item in which the new print setting information is set.

4. The document processing method according to claim 1, wherein the displaying step displays the second setting screen to which default values are set.

5. The document processing method according to claim 1, further comprising a document editing step of editing said document, wherein print settings are changeable in the document editing step.

6. The document processing method according to claim 1, wherein said print setting information includes at least any of printing method, paper direction, gutter and binding direction, page layout, enlargement/reduction, watermark, header and footer, paper discharge method, setting of bookbinding, cover and back cover, index paper, slip paper and chapter separation.

7. A document processor capable of setting print setting information for printing a document, the document processor comprising:
   an importing unit for importing the document;
   a setting unit for setting the print setting information for the document imported by the importing unit;
   an instruction unit for instructing that the print setting information set by the setting unit is registered as template information or that new print setting information is registered as template information;
   a display unit for displaying a first setting screen including an item for setting a name of the template information and including the print setting information set by the setting unit when the instruction unit instructs that the print setting information set by the setting unit is registered as template information, and displaying a second setting screen for setting the new print setting information when the instruction unit instructs that the new print setting information is registered as template information;
   a registration unit for registering the template information for the print setting information set by the setting unit with the name set by using the first setting screen when the first setting screen is displayed by the displaying unit, and registering the template information for the new print setting information set by using the second setting screen when the second setting screen is displayed by the displaying unit; and
   a reading unit for reading the template information registered by said registration unit for the imported document or a new document.

8. The document processor according to claim 7, further comprising a template editing unit for editing the contents of a template registered by the registration unit.

9. The document processor according to claim 7, wherein the second setting screen contains an item in which a name of the template information is set and an item in which the new print setting information is set.

10. The document processor according to claim 7, wherein the display unit displays the second setting screen to which default values are set.

11. The document processor according to claim 7, further comprising document editing unit for editing said document, wherein print settings are changeable by the document editing unit.

12. The document processor according to claim 7, wherein said print setting information includes at least any of printing method, paper direction, gutter and binding direction, page layout, enlargement/reduction, watermark, header and footer, paper discharge method, setting of bookbinding, cover and back cover, index paper, slip paper and chapter separation.

13. A computer program product including a computer-readable recording medium to which a computer-executable program is recorded, the program causing a computer to execute a document processing method wherein print setting information for printing a document is set, and the program comprising:
   a code for an importing process for importing the document;
   a code for a setting process for setting the print setting information for the document imported by the importing process;
   a code for an instructing process for instructing that the print setting information set by the setting process is registered as template information or that new print setting information is registered as template information;
   a code for a displaying process for displaying a first setting screen including an item for setting a name of the template information and including the print setting information set by the setting process when the instructing process instructs that the print setting information set by the setting process is registered as template information, and displaying a second setting screen for setting the new print setting information when the instructing process instructs that the new print setting information is registered as template information;
   a code for a registration process for registering the template information for the print setting information set by the setting process with the name set by using the first setting screen when the first setting screen is displayed by the displaying process, and registering the template information for the new print setting information set by using the second setting screen when the second setting screen is displayed by the displaying process; and a code for a reading process for reading the template information registered by said registration process for the imported document or a new document.

14. The computer program product according to claim 13, further comprising a code for a template editing process for editing the contents of a template registered by said registration process.

15. The computer program product according to claim 13, wherein the second setting screen contains an item in which a name of the template information is set and an item in which the new print setting information is set.

16. The computer program product according to claim 13, wherein the display process displays the second setting screen to which default values are set.

17. The computer program product according to claim 13, further comprising a code for a document editing process for editing said document, wherein print settings are changeable by the code for the document editing processing.

18. The computer program product according to claim 13, wherein said print setting information includes at least any of printing method, paper direction, gutter and binding direction, page layout, enlargement/reduction, watermark, header and footer, paper discharge method, setting of bookbinding, cover and back cover, index paper, slip paper and chapter separation.

19. The document processing method according to claim 1, wherein said setting step sets print setting information for respective chapters and print setting information for respective pages, said registration step registers the template information containing the print setting information for respective chapters when a chapter is selected and the instruction step instructs that the print setting information set in the setting step is registered as the template information, and said registration step registers the template information containing the print setting information for respective pages when a page is selected and the instruction step instructs that the print setting information set in the setting step is registered as the template information.

20. The document processor according to claim 7, wherein said setting unit sets print setting information for respective chapters and print setting information for respective pages, said registration unit registers the template information containing the print setting information for respective chapters when a chapter is selected and the instruction unit instructs that the print setting information set by the setting unit is registered as the template information, and said registration unit registers the template information containing the print setting information for respective pages when a page is selected and the instruction unit instructs that the print setting information set by the setting unit is registered as the template information.

21. The computer program according to claim 13, wherein said setting process sets print setting information for respective chapters and print setting information for respective pages, said registration process registers the template information containing the print setting information for respective chapters when a chapter is selected and the instruction process instructs that the print setting information set by the setting process is registered as the template information, and said registration process registers the template information containing the print setting information for respective pages when a page is selected and the instruction process instructs that the print setting information set by the setting process is registered as the template information.

* * * * *

UNITED STATES PATENT AND TRADEMARK OFFICE
CERTIFICATE OF CORRECTION

| | |
|---|---|
| PATENT NO. | : 7,426,057 B2 |
| APPLICATION NO. | : 10/780655 |
| DATED | : September 16, 2008 |
| INVENTOR(S) | : Yasuo Mori et al. |

It is certified that error appears in the above-identified patent and that said Letters Patent is hereby corrected as shown below:

ON THE TITLE PAGE, ITEM (56):
    Foreign Patent Documents, "6119327" should read -- 61-19327 --.

DRAWINGS:
    Sheet 4, FIG., 4A, "LETER" should read -- "LETTER --; and
    Sheet 4, FIG. 4A, "POSSIBL" should read -- POSSIBLE --.

COLUMN 1:
    Line 59, "exiting" should read -- existing --.

COLUMN 6:
    Line 39, "a" should be deleted.

COLUMN 8:
    Line 4, "zoom" should read -- "zoom", --; and
    Line 29, "book". The" should read -- "book", the --.

COLUMN 9:
    Line 39, "step 803," should read -- step S803, --.

COLUMN 10:
    Line 41, "cover/back cover" should read -- "cover/back cover", --;
    Line 45, "printout" should read -- print out --; and
    Line 64, "two-sided pint/single-sided print", should read
-- "two-sided print/single-sided print", --.

UNITED STATES PATENT AND TRADEMARK OFFICE
CERTIFICATE OF CORRECTION

PATENT NO. : 7,426,057 B2
APPLICATION NO. : 10/780655
DATED : September 16, 2008
INVENTOR(S) : Yasuo Mori et al.

It is certified that error appears in the above-identified patent and that said Letters Patent is hereby corrected as shown below:

COLUMN 11:
  Line 48, "files" should read -- file --.

COLUMN 12:
  Line 13, "an" should read -- a --.

COLUMN 16:
  Line 7, "value" should read -- values --.

COLUMN 18:
  Line 4, "system" should read -- a system --.

Signed and Sealed this

Seventh Day of April, 2009

JOHN DOLL
*Acting Director of the United States Patent and Trademark Office*